US008686886B2

(12) United States Patent
Sasaki et al.

(10) Patent No.: US 8,686,886 B2
(45) Date of Patent: Apr. 1, 2014

(54) FIELD DEVICE CONTROLLING SYSTEM

(75) Inventors: Kouki Sasaki, Tokyo (JP); Hiroyuki Tsugane, Tokyo (JP)

(73) Assignee: Azbil Corporation, Tokyo (JP)

( * ) Notice: Subject to any disclaimer, the term of this patent is extended or adjusted under 35 U.S.C. 154(b) by 96 days.

(21) Appl. No.: 13/398,950

(22) Filed: Feb. 17, 2012

(65) Prior Publication Data

US 2012/0249349 A1    Oct. 4, 2012

(30) Foreign Application Priority Data

Mar. 29, 2011    (JP) ................................. 2011-073293

(51) Int. Cl.
*H03M 1/00*    (2006.01)

(52) U.S. Cl.
USPC ........................................ 341/136; 341/126

(58) Field of Classification Search
USPC ................... 341/126, 155, 144, 120
See application file for complete search history.

(56) References Cited

U.S. PATENT DOCUMENTS

| 6,889,156 | B2* | 5/2005 | Pillai .............................. 702/118 |
| 8,326,230 | B2* | 12/2012 | Schirrmacher et al. .... 455/67.11 |
| 8,396,429 | B2* | 3/2013 | Negami et al. ............. 455/67.11 |
| 8,467,751 | B2* | 6/2013 | Li .............................. 455/127.4 |

FOREIGN PATENT DOCUMENTS

| JP | 7-209050 A | 8/1995 |
| JP | 9-244732 A | 9/1997 |
| JP | 10-47302 A | 2/1998 |
| JP | 11-212901 A | 8/1999 |
| JP | 2010-141654 A | 6/2010 |
| KR | 10-1998-0072411 A | 11/1998 |
| KR | 10-0781489 B1 | 12/2007 |

OTHER PUBLICATIONS

Korean Office Action, dated Feb. 21, 2013, which issued during the prosecution of Korean Patent Application No. 10-2012-0003809, which corresponds to the present application.

* cited by examiner

*Primary Examiner* — Brian Young
(74) *Attorney, Agent, or Firm* — Troutman Sanders LLP

(57) ABSTRACT

A device monitoring unit obtains, through respective digital communication routes, a combination of a digital setting value for an analog output value to an analog communication route in a field device, a digital value of an AD converting device in an input/output unit, and one of the digital setting values stored in a memory of the input/output unit, to check the status of the communication through the analog communication route based on the values obtained.

2 Claims, 17 Drawing Sheets

FIELD DEVICE CONTROLLING SYSTEM

CROSS REFERENCE TO RELATED APPLICATIONS

The present application claims priority under 35 U.S.C, §119 to Japanese Patent Application No. 2011-073293, filed Mar. 29, 2011, which is incorporated herein by reference.

FIELD OF TECHNOLOGY

One aspect of the present invention relates to a field device controlling system.

BACKGROUND

The technologies set forth in Japanese Unexamined Patent Application Publication 1-19-244732; Japanese Unexamined Patent Application Publication 2010-141654; Japanese Unexamined Patent Application Publication 1-107-209050; and Japanese Unexamined Patent Application Publication H10-047302, are known as examples of technology for monitoring or controlling the status of field devices. Moreover, the technology set forth in Japanese Unexamined Patent Application Publication H11-212901 is known as an example of a technology for recognizing correctly whether or not an electronic device is connected.

However, in the conventional technology no thought is given to including, in the scope of monitoring, the analog communication routes to which the field devices are connected when monitoring the status of the field devices.

One object of the present invention is to be able to check the status of communication through the analog communication routes to which the field devices when monitoring the status of the field devices are connected.

Note that there is no limitation to the aforementioned object, but rather being able to obtain effects in operation that are not provided by the conventional technology, which are effects in operation derived through the various structures illustrated in the form for carrying out the present invention, described below, can also be positioned as other objects of the present invention.

SUMMARY

One example of a field device controlling system according to the present invention includes one or more field devices; an input/output unit connected so as to be able to communicate with the field device through an analog communication route; and a device monitoring unit connected so as to be able to communicate with a field device through a digital communication route through an input/output unit; wherein: the field device comprises: a DA converting device for performing digital-analog (DA) conversion of a digital setting value for an analog output value to the analog communication route; and an outputting portion for outputting, to the analog communication route, an analog signal in accordance with the analog value that has been DA conversion; wherein: the input/output unit comprises: a memory for storing the digital setting value that is applied to the field device through the analog communication route after DA conversion into an analog value; and an AD converting device for performing analog-digital (AD) conversion of the analog signal inputted through the analog communication route from the field device; wherein: the device monitoring unit comprises: a check tool for obtaining, through respective digital communication routes, a combination of (1) the digital setting value in the field device, (2) the digital value of the AD converting device in the input/output unit, and (3) One of the digital setting values stored in the memory of the input/output unit, and for checking the status of the communication through the analog communication route based on the values obtained.

Here the input/output unit may receive the digital setting value, stored in the memory, from the device monitoring unit through the digital communication route; and the check tool of the device monitoring unit may check the status of communication through the analog communication route and the status of communication through the digital communication route based on the (1) digital setting value and the (2) digital value.

Here the input/output unit may receive the digital setting value, stored in the memory, through a second digital communication route from a controller that is connected so as to be able to communicate with the input/output unit through the second digital communication route that is separate from the digital communication route; and the check tool of the device monitoring unit may check the status of communication through the analog communication route and the status of the second digital communication route based on the (1) digital setting value and the (3) digital setting value.

DETAILED DESCRIPTION

Examples of the present invention are explained below in reference to the drawings. However, the example explained below is no more than an illustration, and is not intended to exclude various modifications and applications to technologies not explicated below. That is, the present invention can be embodied in a variety of modified forms (such as combinations of individual examples of embodiment), in the scope that does not deviate from the spirit and intent thereof. In the descriptions of the drawings below, identical or similar components are assigned identical or similar codes. The drawings are schematic, and do not necessarily match actual dimensions, ratios, or the like. Furthermore, even within these drawings there may be portions having differing dimensional relationships and proportions.

(1-1) System Configuration

Figure 1:
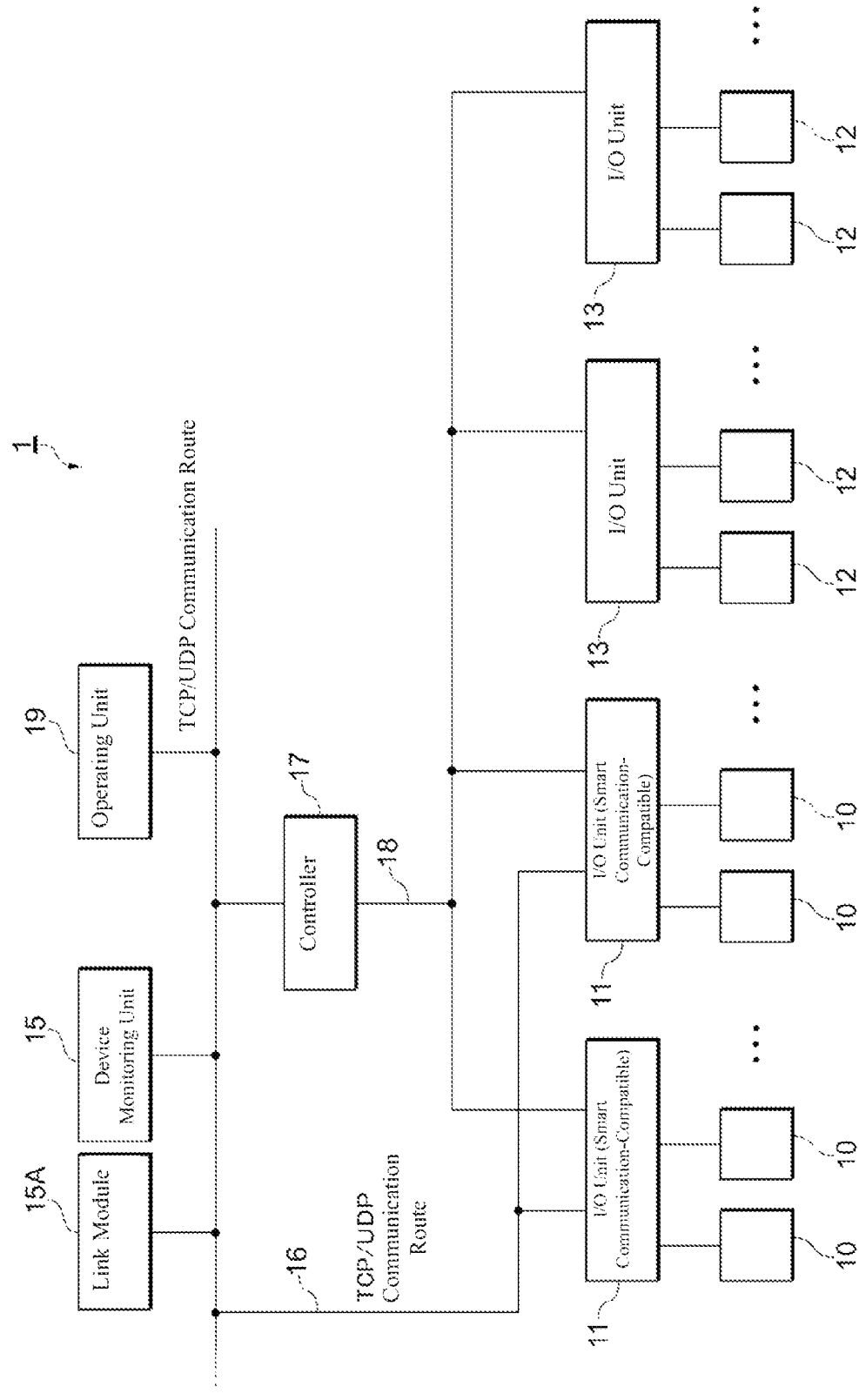
FIG. 1 is a diagram illustrating an example of a process controlling system according to an example.

FIG. 1 is a diagram illustrating an example of a process controlling system. The process controlling system 1, illustrated in FIG. 1, is provided, by means of illustration, with one or more smart communication-compatible field devices (hereinafter termed also "smart communication-compatible devices") 10 and one or more field devices 12 which, although not compatible with smart communications, are compatible with other types of communications.

One example of "smart communications" is communication based on the HART® (Highway Addressable Remote Transducer) communication protocol or field bus communication based on a field bus communication protocol. One example of "other types of communications" is communication based on a proprietary standard, such as Xbus, or the like, described below. The HART® communication, the field bus communication, and the communication of the proprietary standard are all examples of digital communication.

A transmitter and a positioner are examples of field devices 10 or 12. Examples of transmitters are various types of sensors such as flow rate sensors, pressure sensors, temperature sensors, and the like. Examples of positioners are devices that perform conversion of electric signals into signals in accordance with, for example, air pressures that are to be controlled, and then perform positional control of valves, such as flow rate controlling valves or pressure controlling valves, or the like, in accordance with those signals.

Moreover, the process controlling system 1 may be provided with one or more smart communication-compatible input/output (I/O) units 11, one or more input/output (I/O) units 13 that are not compatible with smart communications, a device monitoring unit 15, a link module 15A, a controller 17, and an operating unit 19, and the like.

In short, the operating unit 19 is able to communicate with the controller 17, and with each of the field devices 10 and 12 through the I/O units 11 and 13. Through this communication, the operating unit 19 is able to obtain measured values from the field devices 10 and 12, apply setting values and control values to the field devices 10 and 12 based on the measured values, and the like. In other words, the controller 17 and the operating unit 19 form one example of a controlling system that performs process control through a first control circuit through the I/O units 11 and 13.

In contrast, the device monitoring unit 15 is able to communicate with the smart communication-compatible field devices 10 through the smart communication-compatible I/O units 11 in cooperation with the link module 15A. Through this communication, the device monitoring unit 15 is able to obtain information indicating the statuses of, for example, the field devices 10 (for example, process information, fault information, and the like). In other words, the device monitoring unit 15 and the link module 15A form an example of a monitoring system for monitoring the statuses, etc., of the smart communication-compatible devices 10 through a second communication route through the I/O units 11.

More specifically, the smart communication-compatible I/O units 11, the device monitoring unit 15, the link module 15A, the controller 17, and the operating unit 19 are able to connect to a specific communication route 16. An example of a communication route 16 is a TCP/UDP communication route wherein digital communication is possible based on the TCP (Transmission Control Protocol) and UDP (User Datagram Protocol).

An Ethernet (registered trademark) communication route (a cable) is an example of a TCP/UDP communication route (digital communication route) 16. Consequently, the operating unit 19 is able to perform TCP/UDP communication with, for example, the device monitoring unit 15 and the controller 17, and the like, and the device monitoring unit 15 is able to perform TCP/UDP communication with, for example, the link module 15A and the I/O units 11, and the like.

The controller 17, by way of illustration, can be connected through a specific communication route 18 so as to be able to communicate mutually with the I/O units 11 and 13. An example of the communication route 18 is a proprietary standard, Xbus, that is specialized to communication functions for the controller 17 and the I/O units 13. Xbus is an example of a digital communication route that enables digital communication between the controller 17 and the I/O units 13.

The smart communication-compatible devices 10 can be connected to the smart communication-compatible I/O units 11. Field devices 12 can be connected to the I/O units 13. These connections can use analog communication routes that transmit analog DC signals (for example, between 4 mA and 20 mA).

The analog DC signals are an example of signals that express variables in accordance with the field devices 10 and field devices 12. Examples of the variables include flow rates, pressures, temperatures, and other measured values, along with control values such as the degrees of opening, for example, of pumps and valves, obtained from field devices 10 such as flow rate gauges, pressure gauges, temperature gauges, and the like.

Consequently, the field devices (hereinafter also called just "devices") 10 and 12 are able to send analog DC signals of electric current values (between 4 and 20 IDA), in accordance with measured values, to the controller 17 through the I/O units (hereinafter also called "I/O modules") 11 and 13, and are also able to receive analog DC signals of electric current values (between 4 and 20 mA) in accordance with setting values or control values, or the like, that are sent from the controller 17 through the I/O units 11 and 13.

Here the smart communication-compatible I/O units 11 and field devices 10 are able to transmit to each other signals wherein digital signals are superimposed onto the analog DC signals. In other words, the I/O units 11 and field devices 10 are able to perform simultaneously analog communication using the analog DC signals (between 4 and 20 mA) and digital communication using digital signals.

The digital signals that are superimposed onto the analog DC signals are, by way of illustration, signals that express various types of data that can be obtained by the smart communication-compatible device 10. Examples of the various types of data include information indicating the statuses of the smart communication-compatible devices 10 (for example, process information or information indicating the status of a device 10). Note that measured values and control values, and the like, for the smart communication-compatible devices 10 may be included in these various types of data.

An example of a smart communication protocol wherein a digital signal is superimposed onto an analog DC signal is the HART® communication protocol that has been mentioned already. In the HART® communication protocol, a digital signal that has been converted (for example, phase modulated) so as to express digital values of 0 and 1 using two different frequency signals (for example, 1200 Hz and 2200 Hz) is superimposed onto an analog DC signal of between 4 and 20 mA.

When an I/O unit 11 (or field device 10) receives, from a field device 10 (or an I/O unit 11) an analog DC signal onto which a digital signal has been superimposed in this way, it divides the received signal into an analog DC signal and a digital signal. Doing so makes it possible for the I/O unit 11 (or field device 10) to obtain values or data that indicate the respective signals that have been separated.

In other words, the analog communication route between the field devices 10 and 12 and the I/O units 11 and 13, and the digital communication route 18 between the I/O units 11 and 13 and the controller 17, form one example of a first communication route in a controlling system.

On the other hand, the analog communication route between the smart communication-compatible field devices 10 and I/O units 11 and the digital communication route 16 between the smart communication-compatible I/O units 11 and the link module 15A and the device monitoring unit 15 form one example of a second communication route in a monitoring system.

Examples of configurations of the smart communication (HART® communication)-compatible I/O units 11 and field devices 10, described above, are each illustrated in FIG. 2.

(1-1-1) Smart Communication-Compatible I/O Unit

Figure 2:
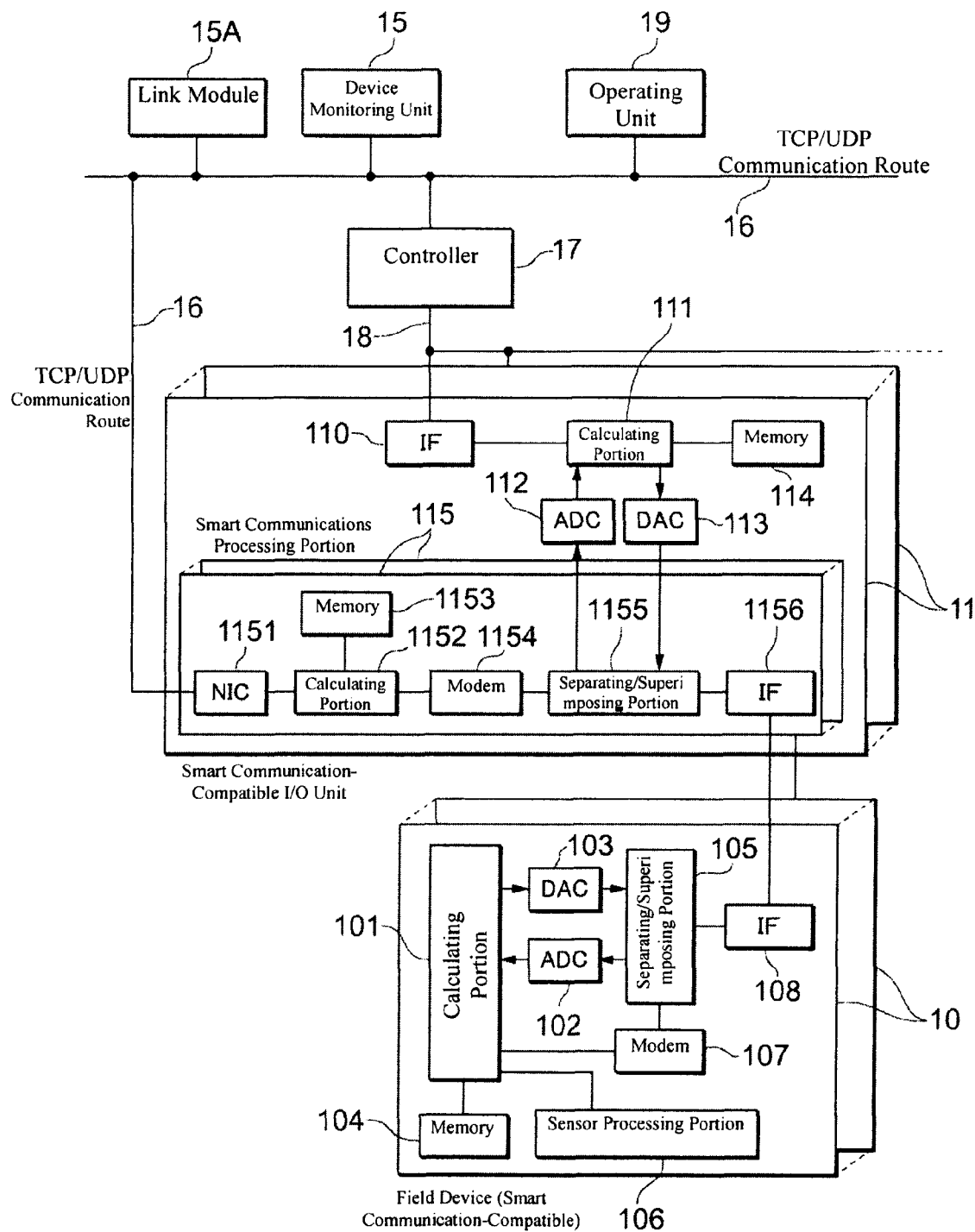
FIG. 2 is a block diagram illustrating an example of a configuration for a field device and an I/O unit, compatible with the smart communication illustrated in FIG. 1.

The I/O unit 11 illustrated in FIG. 2, by way of illustration, comprises: an interface (IF) 110 that provides a connection to an Xbus 18; a calculating portion 111; an analog-digital converting device (ADC) 112; a digital-analog converting device (DAC) 113; a memory 114; and a smart communications processing portion 115. The smart communications processing portion 115 may be provided in a plurality thereof, so as to be able to handle a plurality of devices. The smart communications processing portion 115, by way of illustration, comprises: a network interface card (NIC) 1151 for providing a connection with the TCP/UDP communication route 16; a calculating portion 1152; a memory 1153; a smart communication (HART® communication) modem 1154; a separating/superimposing portion 1155; and an interface 1156.

Schematically, the communication between the controller 17 and a field device 10 through an I/O unit 11 is performed through a route that passes through the interface 110, the calculating portion 111, the ADC 112 or the DAC 113, the separating/superimposing portion 1155, and the interface 1156.

Note that the calculating portion 111 stores, into the memory 114, digital signals that are inputted from the ADC 112 and digital signals that are applied to the DAC 113. In other words, information such as control values that are applied to the field device 10, and measured values, and the like, that are obtained from the field device 10, are stored in the memory 114.

The communication between the device monitoring unit 15 (or the link module 15A) and the field device 10, through an I/O: unit 11, for the aforementioned communication between the controller 17 (the operating unit 19) and the field device 10, is performed in a route that passes through the NIC 1151, the calculating portion 1152, the smart communications modem 1154, the separating/superimposing portion 1155, and the interface 1156.

For example, control information, such as commands, or the like, which are digital signals that are asserted by the device monitoring unit 15 (or the link module 15A) are inputted into the smart communications modem 1154 through the NIC 1151 and the calculating portion 1152, and, in the modem 1154, are converted into two different frequency signals corresponding to digital values (through, for example, FSK (Frequency Shift Keying) modulation), and then are superimposed onto the analog DC signal to the field device 10 by the separating/superimposing portion 1155. This produces a smart communication signal wherein a digital signal is superimposed, as a frequency signal, on the analog DC signal, and the smart communication signal is outputted through the interface 1156 to the applicable field device 10.

On the other hand, the smart communication signal received through the interface 1156 is split by the splitting/superimposing portion 1155 into an analog DC signal and the two different frequency signals that are superimposed on the analog DC signal. The analog DC signal is applied to the calculating portion 111 after conversion into a digital signal by the ADC 112, as described above. The two different frequency signals indicate, for example, information obtained from the field device 10 (device information, etc.), and are applied to the calculating portion 1152 after conversion (for example, demodulation) into the respectively corresponding digital values by the smart communications modem 1154. The calculating portion 1152 sends the digital signals Obtained from the modem 1154 to the device monitoring unit 15 (or the link module 15A) through the NIC 1151.

Note that the calculating portion 1152 is able to store, into the memory 1153, the digital signal inputted from the NIC 1151 and/or the digital signal inputted from the smart communications modem 1154. In other words, the control information applied from the device monitoring unit 15 (or the link module 15A), and the device information, and the like, obtained from the field devices 10 may be stored, as necessary, in the memory 1153.

Additionally, the calculating portion 1152 can connect to the calculating portion 111 through an internal bus, not shown, so as to be able to communicate, making it possible to receive, from the calculating portion 111, information stored in the memory 114. Similarly, the calculating portion 111 is able to receive, from the calculating portion 1152, information stored in the memory 1153.

The device information obtained from the field devices 10 (hereinafter also termed "live list information") may include, if necessary, information elements on the same level as device definition information that is stored and controlled by the device monitoring unit 15.

Examples of these information elements include the smart communication protocol revision, the node number of the link module 15A, network address information for the link module 15A, network address information for the I/O modules 11, PO module numbers, slot numbers, device tags, device Ds, device types, device revisions, vendors, vendor IDs, module names, and so forth.

Note that the calculating portions 111 and 1152 are examples of signal processors that are provided with calculation processing capabilities. CPUs (central processing units), MPUs (microprocessing units), DSPs (digital signal processors), ASICs (application-specific processors), and the like, may be used in the calculating portions 111 and 1152.

(1-1-2) Smart Communication-Compatible Devices

On the other hand, a smart communication-compatible device 10, as illustrated in FIG. 2, is provided with, for example, a calculating portion 101, an ADC 102, a DAC 103, a memory 104, a separating/superimposing portion 105, a sensor processing portion 106, a smart communications modem 107, and an interface (IF) 108 for providing a connection to an analog communication route though an I/O module 11.

Schematically, the analog communication between the smart communication-compatible device 10 and the I/O unit 11 is performed through a route through the calculating portion 101, the ADC 102 and the DAC 103, the separating/superimposing portion 105, and the interface 108 (or in other words, a route that does not pass through the smart communications modem 107).

For example, a control value that is received through an analog DC signal from the I/O unit 11 through the interface 108 is inputted through the separating/superimposing portion 105 into the ADC 102, and inputted into the calculating portion 101 after being converted into a digital signal through ADC. The calculating portion 101 performs a process of a sensor processing portion 106 (for example, valve control, or the like) based on the control value of the digital signal. On the other hand, a measured value that is obtained from, for example, the sensor processing portion 106 by the calculating portion 101 is converted by the DAC 103 into an analog DC signal, and then is inputted into an I/O unit 11 through the separating/superimposing portion 105 and the interface 108.

Note that the calculating portion 101 stores, into the memory 104, digital signals that are inputted from the ADC 102 and digital signals that are applied to the DAC 103. In other words, information such as control values applied from the controller 17 and measured values obtained from the sensor processing portion 106 can be stored in the memory 104.

In contrast to the analog communication described above, the digital communication between the smart communication-compatible device 10 and an I/O unit 11 is performed through a route that passes through the calculating portion 111, the smart communications modem 107, the separating/superimposing portion 105, and the interface 108.

For example, the two different frequency signals that are superimposed on the analog DC signal that is received by the interface 108 (for example, control information such as smart communication commands, or the like) are separated by the separating/superimposing portion 105, are converted, by the smart communications modem 107, into digital values corresponding to the frequency signals, and are inputted into the calculating portion 101. This makes it possible for the calculating portion 101 to generate a response, for example, to the device monitoring unit 15 (or the link module 15A) that is the source that issued the command, in response to the control information that has been received. This response may include, for example, device information that is stored in the memory 104.

On the other hand, the digital signal, generated by the calculating portion 101, directed to the device monitoring unit 15 (or the link module 15A) (for example, the aforementioned response) is converted by the smart communications modem 107 into the two different frequency signals in accordance with the digital values thereof, and then superimposed, by the separating/superimposing portion 105, onto the analog DC signal to the I/O unit II, and then inputted into the I/O unit 11 through the interface 108.

Note that the calculating portion 101, as with the calculating portion 111 and calculating portion 1152 in the I/O unit is an example of a signal processor that is provided with calculation processing capabilities, and may use a CPU or an MPU, a DSP, an ASIC or the like.

Next, in FIG. 1 and FIG. 2, the controller 17 controls the execution statuses of the processes by controlling, for example, the field devices 10 and/or field devices 12. To provide a non-limiting example, the controller 17 may adjust the degree of opening, or the like, of a valve, or the like, by controlling one of the field devices 10 (or 12) as a positioner of an actuator, or the like, based on a measured value obtained from the field device 10 (or 12), as a transmitting device that is a sensor, or the like.

The operating unit 19 is able to output, to a monitor, or the like, the operating statuses, or the like, of the field devices 10 and 12 based on measured values of the field devices 10 and 12, receive from the controller 17. On the other hand, the operating unit 19 is able to control the individual operating statuses of the field devices 10 and/or 12 through the controller 17 by applying setting values and control values to the controller 17.

The link module ISA obtains device information of the smart communication-compatible devices 10, for example, that are connected to I/O units 11, through the smart communication-compatible I/O units 11 through the TCP/UDP communication route 16. A portion or the entirety of the device information (live list information) obtained can be stored in a memory (not shown), or the like, of the link module 15A. The link module 15A can provide, to the device monitoring unit 15, a portion or the entirety of the live list information through the TCP/UDP communication route 16 in response to a query from the device monitoring unit 15.

On the other hand, the link module ISA is able to receive responses, event notifications, and the like, from the smart communication-compatible devices 10, and able to send, to the device monitoring unit 15, through the TCP/UDP communication route 16, the responses, event notifications, and the like, that have been received. Note that while in FIG. 1 and FIG. 2 the link module 15A is illustrated as being separate from the device monitoring unit 15, it may instead be included within the device monitoring unit 15.

The device monitoring unit 15, together with the link module 15A, performs monitoring, diagnostics, and the like, of the devices 10 that are connected to the applicable I/O units 11 through communicating with the smart communication compatible I/O units 11 through the TCP/UDP communication route 16. As examples of monitoring and diagnostics there are checks of the execution statuses of the processes of the devices 10, the statuses of the devices 10, and the like, and diagnostics, and the like, of for example, the timing with which maintenance and repairs are required on the device 10.

In order to perform the monitoring and diagnostics, in the device monitoring unit 15, the definitions used in, for example, engineering tools (hereinafter also termed "device definition tools"), and the like, and device definition information (control device information) that have been set are stored in a memory (not shown), or the like, as a device information file.

By way of illustration, the device definition file ma include, as necessary, information such as smart communication protocol revisions, node numbers of the link module 15A, network address information for the link modules ISA, and network address information, file numbers for the applicable device definition files, I/O module numbers, slot numbers, device tags, device IDs, device types, device revisions, vendors, vendor IDs, model names, and the like, for the I/O units 11.

Note that the information set comprising the node number, the file number, the I/O module number, and the slot number may be used as information for specifying the route from the device monitoring unit 15 to the device 110 (Route information).

The processes such as the various types of checks and diagnostics for the devices 10 by the device monitoring unit 15 may include some or all of the processes (1) through (5), given as illustrative examples below. Note that these processes (1) through (5) shall be referred to as a whole by the term "loop check," below.

(1) Device Existence Check
(2) Commissioning
(3) Analog Input (AI) Check
(4) Analog Output (AO) Check
(5) Progress Check (regarding the operations in (1) through (4), above)

(1) The "Device Existence Check" is a process for checking (making an OK/NG evaluation) the electrical connection status for a device 10 that is connected to an I/O module 11 (hereinafter also termed the "device connection status") through the monitoring system, for example. The check result is outputted to a monitor 156 (shown in FIG. 3), for example, of the device monitoring unit 15. Non-limiting examples of "device connection statuses" include "Connected," "Disconnected," "Not Configured," "Unknown," "Mismatch," and the like. By way of illustration, the device monitoring unit 15 may evaluate as "OK" if the device connection status is "Connected," "Disconnected," or "Not Configured," and may evaluate as "NG" if "Unknown" or "Mismatch,"

(2) "Commissioning" is a process for performing a consistency check (OK/NG), for example, of the existing device definition information that is set in the device monitoring unit 15 using the engineering tools, and the like, for controlling the devices 10, and the device information (live list information) obtained from the devices 10 through the monitoring system (for example, the link module 15A). Note that in regards to "Commissioning," the device monitoring unit 15 is able to execute a (2-1) Range Check and/or an (2-2) Output Value Check. The "Range Check" is a process for checking whether or not the upper limit values (high ranges) and/or lower limit values (low ranges) of the variables set in the device 10 are correct, where the "Output Value Check" is a process for checking the output value of the device 10. Output values that are subject to checking include, for example, pressure values (PV), flow rate values (SV), temperature values (TV), and heat quantity values (QV).

(3) The "AI Check" is a process for specifying (controlling) the output value (an analog DC signal between 4 and 20 mA) for the device 10 through the monitoring system, and checking the analog input based on the response (an analog output) of the device 10 to the specification.

(4) The "AO Check" is a process for setting (controlling) the output value (an analog DC signal between 4 and 20 mA) for the device 10 through the controlling system (the controller 17), and checking, through the monitoring system, the response (an analog output) of the device 10 to the setting.

(5) The "Progress Check" is a process for, for example, controlling, independent of the device 10, the check status (progress) for a portion or the entirety of the processes (operations) described above. The progress status information can be displayed on a monitor, or the like, used by an operator such as a process administrator or maintenance technician, or the like.

Note that the system may be such that the execution of a portion or the entirety of the "Commissioning," "AI Check," and "AO Check" is limited to those devices 10 wherein the results of the "Device Existence Check" were "OK," verifying that there is no problem in the connection status. This makes it possible to eliminate unnecessary checks, thereby increasing the operating efficiency of the loop check.

(1-2) Hardware Configuration of the Device Monitoring Unit 15

Figure 3:
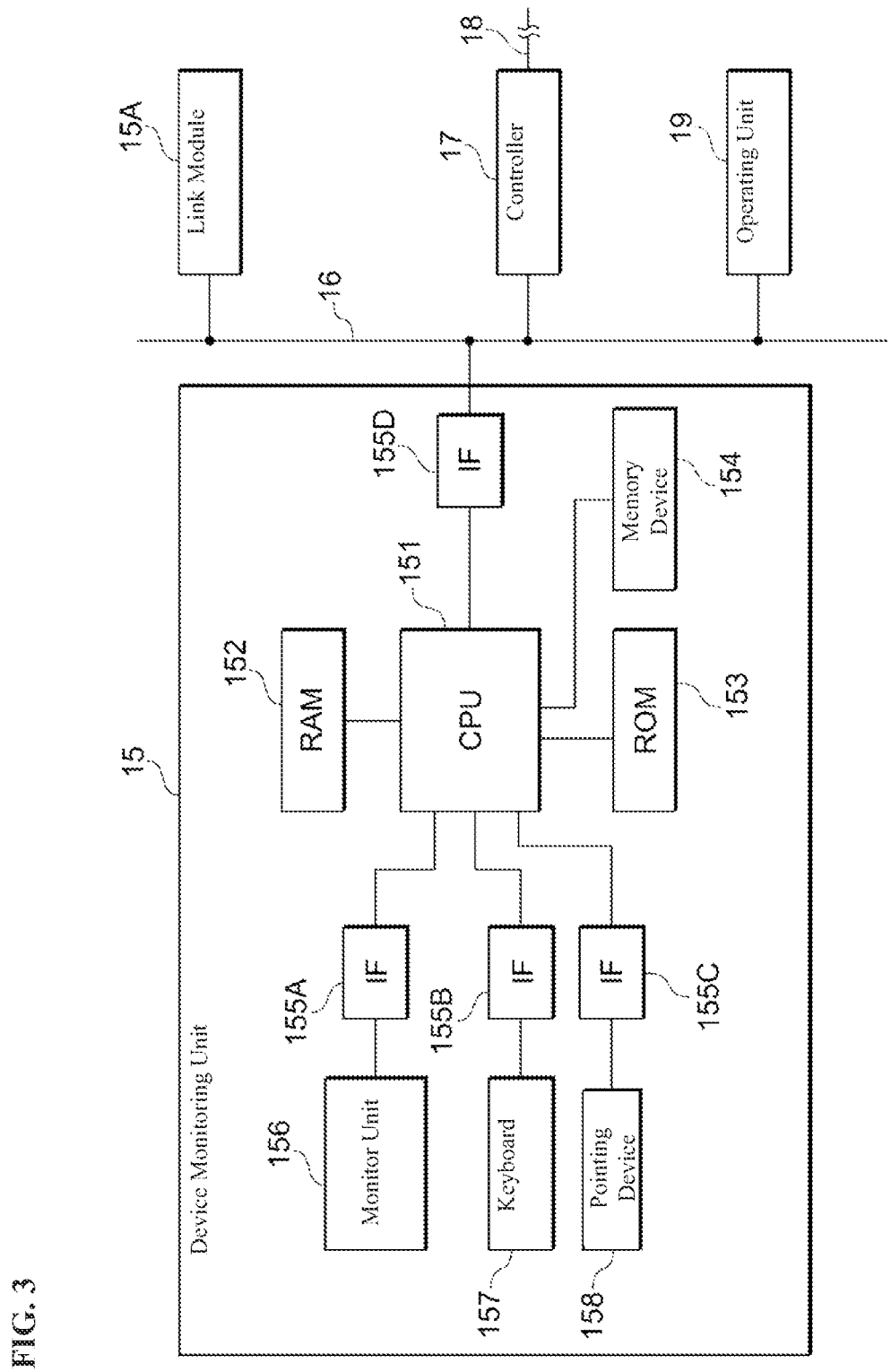
FIG. 3 is a block diagram illustrating an example of a configuration of the device monitoring unit illustrated in FIG. 1.

The device monitoring unit 15 that executes some or all of the loop check, as illustrated in FIG. 3, for example, can be embodied using a data processing device such as a personal computer (PC), or the like.

The device monitoring unit 15 illustrated in FIG. 3, by way of illustration, is provided with: a CPU 151, a RAM (random access memory) 152; a ROM (read only memory) 153; a memory device 154, such as a hard disk; one or more interfaces (IF) 155A through 155D; a monitor 156; a keyboard 157, and a pointing device 158, such as a mouse.

The keyboard 157 and the pointing device 158 are examples of input devices by which an operator inputs information (such as, for example, device information or setting data used in the loop check, or the like) into the device monitoring unit 15.

The monitor 156 is a display device such as a liquid crystal display, a PDP (plasma display panel), an HMD (head-mounted display), or the like, for displaying data that is stored into the RAM 152, the ROM 153, and/or the memory device 154, under the display control of the CPU 151. Note that the monitor 156 may also be provided with an inputting device that is able to input information, such as a touch panel, or the like.

The interfaces 155A through 155C are interfaces that are used for connecting peripheral devices, such as, respectively, the monitor 156, the keyboard 157, and the pointing device 158. The interfaces, by way of illustration, may use interfaces such as USBs, IEEE 1394, serial interfaces, parallel interfaces, infrared, radio, or the like. The interface 155D is a communication interface for connecting the device monitoring unit 15 to, for example, a TCP/UDP communication route 16.

The memory device 154, by way of illustration, stores the device monitoring program for executing the loop check described above, setting data (configuration data), and the like. The device monitoring program may be provided in a form wherein it is recorded on a computer-readable recording medium. Recording media includes, for example, hard disks, magnetic disks, magneto-optical discs, CD ROMs (compact disk read-only memories), DVDs (digital versatile disks), BDs (Mu-ray disks), ROM cartridges, RAM cartridges with battery backup, flash memory cartridges, non-volatile RAM cartridges, and the like. The device monitoring unit, which is an example of a computer, reads in, from the recording medium, the device monitoring program and the setting data, and sends them to the memory device 154 and the RAM 152, for storage and use. Moreover, the device monitoring program may also be provided to the device monitoring unit 15 through, for example, the TCP/UDP communication route 16.

Note that the "computer," by way of illustration, is a concept that includes hardware and an operating system (OS), and may refer to the hardware operating under control of the operating system. Moreover, when it is possible to operate the hardware using a program alone, without requiring an operating system, this hardware may be positioned corresponding to a "computer," The hardware may include a calculating device, such as a CPU, and a reading device that is able to read a program that is stored on a storage medium.

The device monitoring program includes program code by which to achieve, on the computer such as described above, functionality as the device monitoring unit 15. A portion of the functions may be achieved by the operating system rather than by the program.

The ROM 153 is an example of a non-volatile storage medium, and stores a program and data for, for example, setting microcode to the CPU 151, initiating various portions, launching an operating system, or like, from the memory device 154, directing that a program be executed, and the like, when the device monitoring unit 15 is started up.

The RAM 152 is an example of a volatile storage medium, and provides a working area (working memory) for the CPU 151.

The CPU 151 is an example of a signal processor that is provided with calculation processing capabilities. The CPU 151 deploys to the RAM 152, which is a working area, the device monitoring program and setting data that is stored in the ROM 153 or the memory device 154, along with various types of inputted information obtained through the interfaces 1551 through 155C, and causes the computer to function as the device monitoring unit 15 through operating in accordance with the device monitoring program, and the like, that has been deployed. Note that an MPU or a DSP or ASIC may be used instead of the CPU 151.

(1-3) Functional Blocks of the Device Monitoring Unit 15

Figure 4:
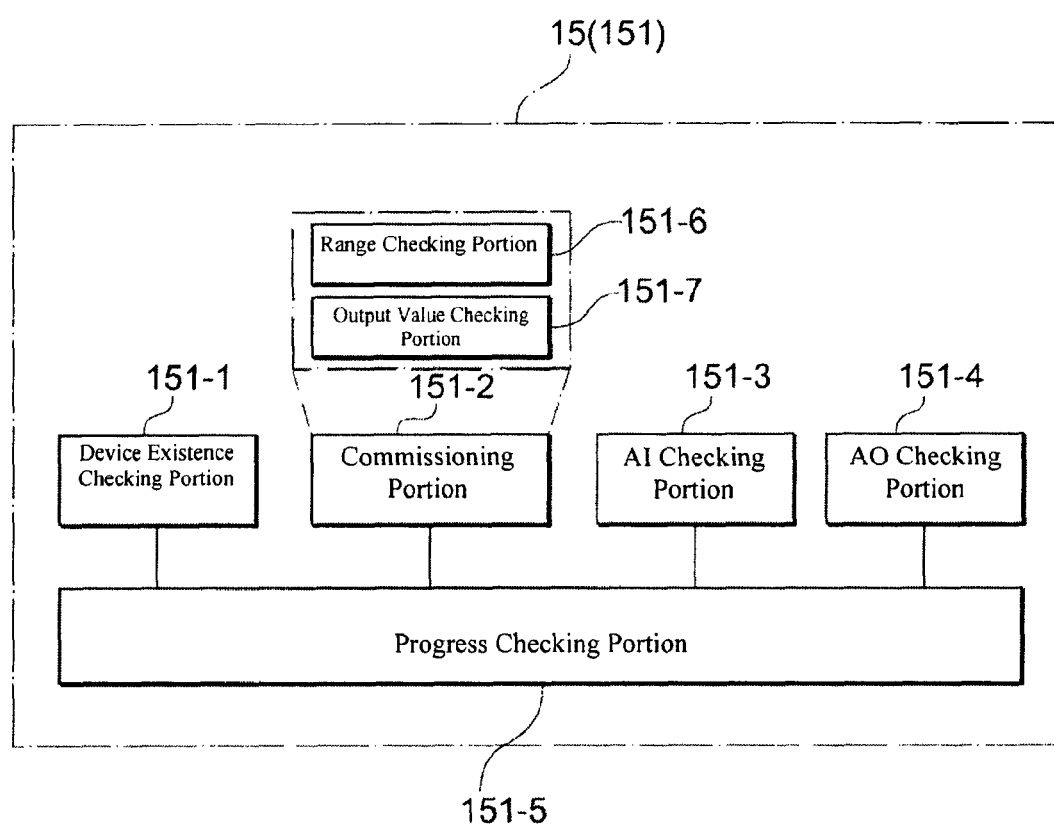
FIG. 4 is a functional block diagram of a device monitoring unit illustrated in FIG. 1 and FIG. 3.

FIG. 4 shows a functional block diagram of a device monitoring unit 15. The device monitoring unit illustrated in FIG. 4 achieves a portion or the entirety of the various portions (tools) 151-1 through 151-6 (which may also be termed the "loop checking tools," below) through the CPU 151 executing the device monitoring program in cooperation with the RAM 152, the ROM 153, and the memory device 154, as described above.

(1) The device existence checking portion (device existence checking tool) 151-1

(2) The commissioning portion (commissioning tool) 151-2

(3) The AI checking portion (AI checking tool) 151-3

(4) The AO checking portion (AC) checking tool) 151-4

(5) The progress checking portion (progress controlling tool) 151-5

Note that the commissioning portion 151-2 may be provided with functions of a range checking portion (range checking tool) 151-6 and/or an output value checking portion (output value checking tool) 151-7.

Moreover, the device monitoring unit 15 (CPU 151), at the time of startup, reads configuration data from, for example, the memory device 154 into the RAM 152. The configuration data includes, by way of illustration, data, and like, for specifying threshold values (for example, tolerance threshold values) used in the pass/fail (OK/NG) evaluations in, for example, the "Range Checks," "AI Checks," and "AO Checks," and the like, data output reading frequencies and intervals (periods'), and the like.

The commissioning portion 151-2 (range checking portion 151-6), the AI checking portion 151-3, and the AO checking portion 151-4 are able to execute, respectively, a "Range Check," an "AI Check," and an "AO check," based on the configuration data that has been read into the RAM 152.

(1-4) Loop Checking by the Device Monitoring Unit 15

Figure 5:
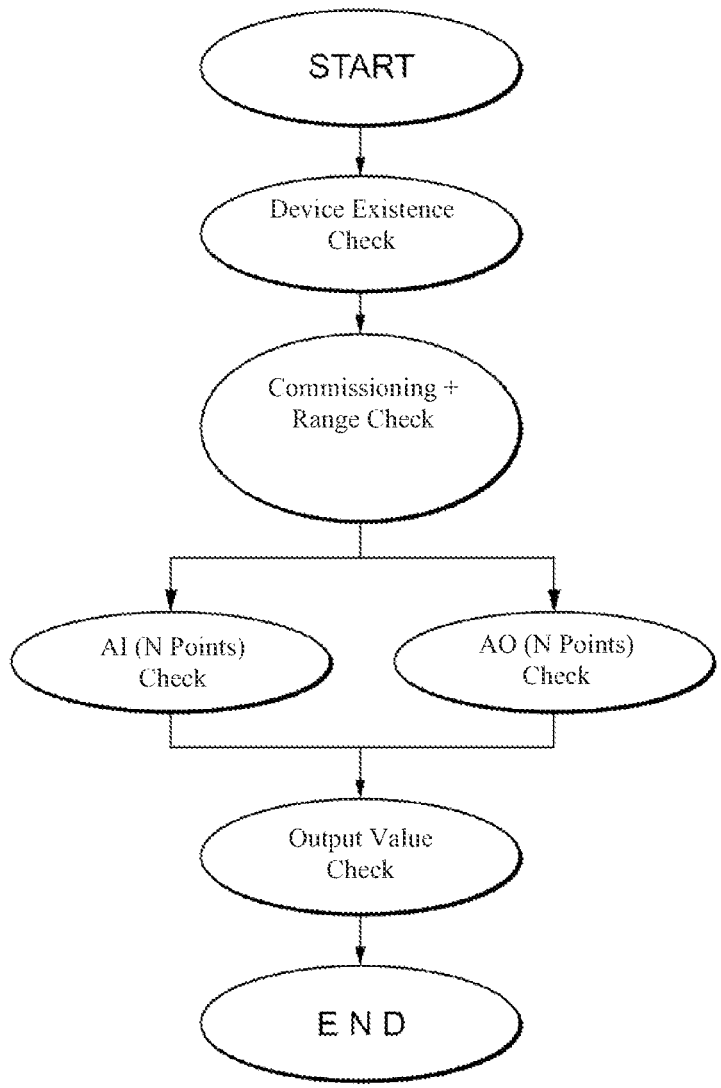
FIG. 5 is a flowchart for explaining the loop check (at startup) by the device monitoring unit illustrated in FIG. 1, FIG. 3, and FIG. 4.
Figure 6:
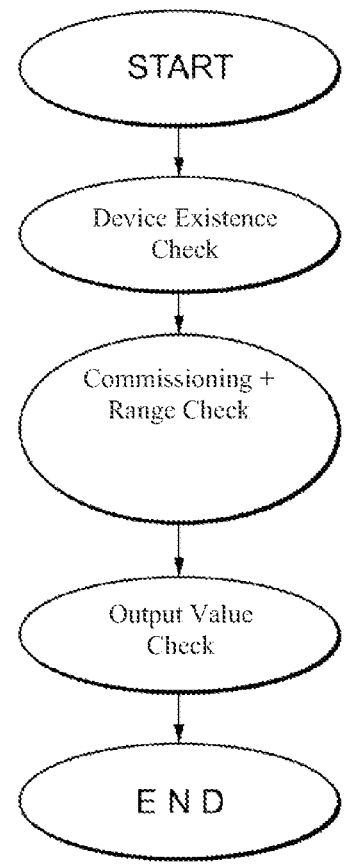
FIG. 6 is a flowchart for explaining the loop check (during operations) by the device monitoring unit illustrated in FIG. 1, FIG. 3, and FIG. 4.

The loop checking by the device monitoring unit 15 can be executed at the time of startup of the factory, plant, or the like (as illustrated in FIG. 5), or at the time of operation thereof (as illustrated in FIG. 6). That is, the device monitoring unit 15 supports the smooth performance of the startup operations or the continuing operations of the factory through the execution of checks of the connection statuses, the parameter setting statuses, and the like, of the field devices at the time at which the factory or plant is started up, and during the operation thereof, and checks of the proper operation of the field devices, and the like.

For example, at the time that a plant is started up, as illustrated in FIG. 5, the device monitoring unit 15 may execute the "Device Existence Check," the "Commissioning," the "Range Check," the "AI Check," the "AO Check," and the "Output Value Check" through the device existence checking portion 151-1, the commissioning portion 151-2, the AI checking portion 151-3, and the AO checking portion 151-4.

On the other hand, during plant operation, as illustrated in FIG. 6, the device monitoring unit 15 may execute the "Device Existence Check," the "Commissioning," the "Range Check," and the "Output Value Check" through the device existence checking portion 151-1, and the commissioning portion 151-2.

The details of the "Device Existence Check," the "Commissioning" (including the "Range Check" and/or "Output Value Check"), the "AI Check," the "AO Check," and the "Progress Check" will be explained item-by-item, below.

Figure 7:
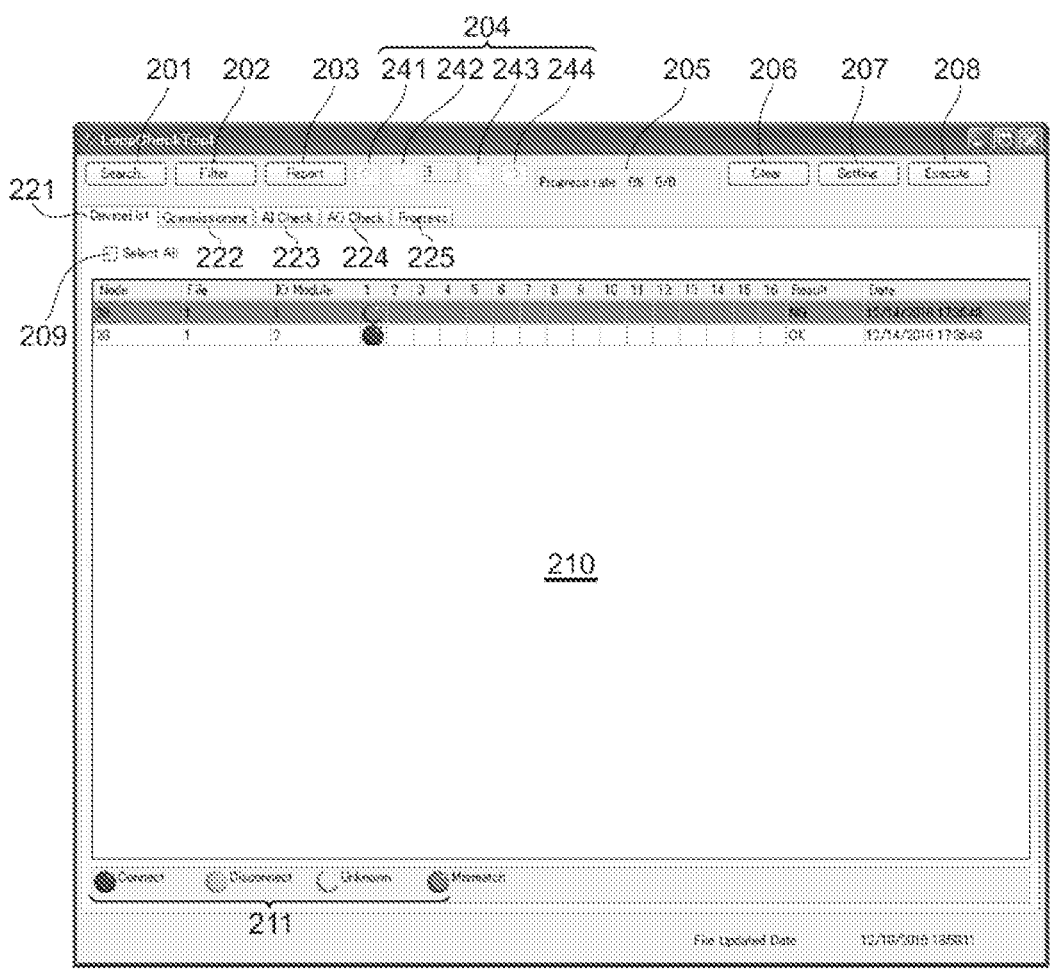
FIG. 7 is a diagram illustrating one example of a Loop Checking Tool window (Device List tab) displayed on a monitor of the device monitoring unit illustrated in FIG. 1, FIG. 3, and FIG. 4.

The device monitoring unit 15, when the loop checking tool is activated, displays on a monitor 156 (illustrated in FIG. 3), for example, a screen (a Loop Checking Tool window) using a graphical user interface (GUI), as illustrated in FIG. 7, for example.

(1-4-1) Device Existence Check

The device existence check can be executed through the Loop Checking Tool window.

By way of illustration, a Search button 201, a Filter button 202, a Report (Generate Report) button 203, page switching buttons 204, a Progress Rate (Display Progress Rate) field 205, a Clear button 206, a Setting button 207, an Execute button 208, a Select All checkbox 209, a Device List Display field 210, and a Status Sample Display field 211 are provided in the Loop Checking Tool window illustrated in HG. 7.

Additionally, as illustrated in FIG. 7, the Loop Checking Tool window may also be provided with tabs 221 through 225 for switching the various functions (tools) for the "Device Existence Check," the "Commissioning," the "AI Check," the "AO Check," and the "Progress Check."

By selecting (clicking) the Device List tab 221, the Commissioning tab 222, the AI Check tab 223, the AO Check tab 224, or the Progress tab 125, the selected tab is displayed in front of the other tabs in the Loop Checking Tool window.

The example display in FIG. 7 is an example display of the state wherein the Device List tab 221 has been selected, making it possible to execute the "Device Existence Check" function (device existence checking portion 151-1). Similarly, if the Commissioning tab 222, the AI Check tab 223, the AO Check tab 224, or the Progress tab 225 were to be selected, then the display would be as illustrated in FIG. 10, FIG. 13, FIG. 15, or FIG. 17, respectively. Note that instead of selecting the function (tool) by switching the tabs 221 through 225, pop-up windows, or the like, corresponding to the respective functions that constitute the loop checking tool may be displayed individually.

The Search button 201 can be used when, for example, specifying search parameters (search keys) to search for a device 10. The device existence checking portion 151-1 is able to display, in the Device List Display field 210, devices 10 that match (hit) the search parameters. Information for the route to the device 10 and the operation completion status can be used as search keys. The search keys can be stored in the device monitoring unit 15 (for example, the RAM 152 or memory device 154, shown in FIG. 3), insofar as the loop checking tool is not terminated.

Figure 8:
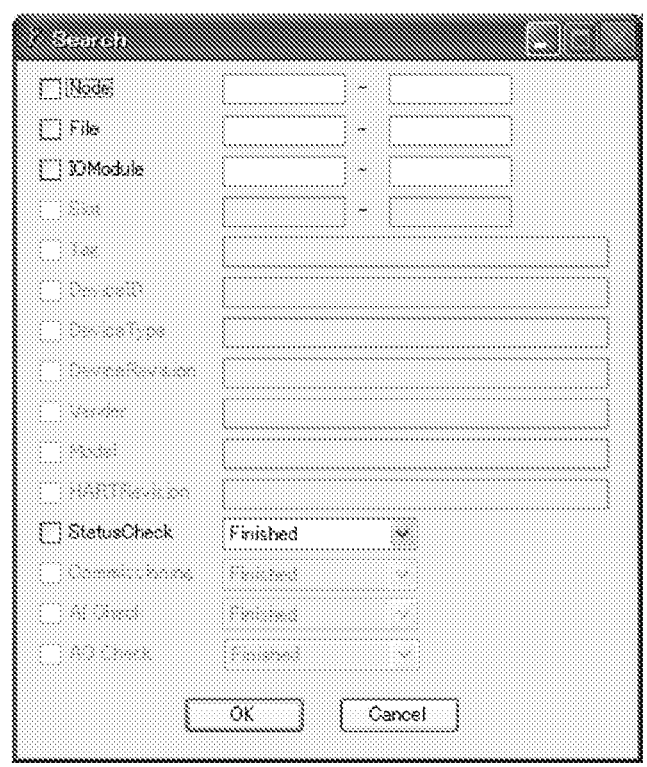
FIG. 8 is a diagram illustrating an example of a display in a Search Parameter Setup window displayed on the monitor of the device monitoring unit illustrated in FIG. 1, FIG. 3, and FIG. 4.

By way of illustration, the search parameters can be set through a Search Parameter Setup screen (window) that uses the GUI. An example display of the Search Parameters Setup window is shown in FIG. 8. In FIG. 8, the search parameters can be set by specifying ranges for each of the route information (for example, "Nodes," "Files," "I/O Modules," and "Slots"). Moreover, the searching can be performed through, for example, partial matches with character strings for the device information ("Tag," "Device ID," "Device Type," "Device Revision," "Vendor," "Model," and the like).

Next, in the example display in FIG. 7, the Filter button 202 is a button for switching between a filtered display and showing all. In the "Filter" state, the "Device Existence Check" will display only the filtered devices 10 in the Device List Display field 210. In the Show All state, the filter is removed and all devices are displayed in the Device List Display field 210. At that time, the filtering by the search parameters specified by the Search button may also be removed. However, the settings for the search parameters may be saved for later use.

When the Report button 203 is selected (for example, clicked), the device existence checking portion 151-1 generates the results of the device connection status check in the form of a file of a specific format. An example of a file of a specific format is a CSV (Comma Separated Value) file.

When a page switching button 204 is clicked, the device existence checking portion 151-1 switches the page of the Device List Display field 210 that is displayed. For example, when the "<<" button 241 is clicked, then the first page is displayed, when the ">>" button 244 is clicked, then the last page is displayed, when the "<" button 242 is clicked, then the previous page is displayed, and when the ">" button 243 is clicked, then the next page is displayed.

The Progress Rate Display field 205 is a field for displaying the rate of progress of the device existence check. The rate of progress can be displayed as, for example, the ratio of the devices 10 for which the device existence check has been completed, in relation to all of the devices 10.

When the Clear button 206 is clicked, then the device existence checking portion 151-1 clears the device connection status check results for the selected devices 10. The Clear button 206 can be placed into a state (the Enabled state) wherein I/O modules 11 for which the device existence check has been completed can be subject to selection operations if selected.

When the Setting button 207 is clicked, the device existence checking portion 151-1 opens a dialog for setting up parameters.

When the Execute button 208 is clicked, the device existence checking portion 151-1 executes the "Device Existence Check," The system may be such that the Execute button 208 may be switched into a Cancel button during the execution of the "Device Existence Check." When the Cancel button is clicked, the device existence checking portion 151-1 will cancel the execution of the "Device Existence Check." Note that the system may be such that the Cancel button is provided separately from the Execute button 208.

When the Select All checkbox 209 is checked, the device existence checking portion 151-1 puts into the selected state all of the devices 10 on the page that is currently displayed in the Device List Display field 210. When the check in the checkbox 209 is cleared, then the device existence checking portion 151-1 clears the Select All.

By way of illustration, the existence check results (the device connection statuses) of the devices 10 are listed in the Device List Display field 210. If an entry (or an icon) for any of the devices 10 is selected, then the device existence checking portion 151-1 may display, in a tooltip, or the like, device information such as the device tag, or the like. The device connection statuses may be displayed by icons in the Status Sample Display field 211, and as illustrated in Table 1, below,

TABLE 1

Device Connection Statuses

| Status | Display (Icon) | Explanation |
| --- | --- | --- |
| Connected | Blue | There is a definition in the device definition information, and the defined device is connected. |
| Disconnected | Grey | There is a definition in the device definition information, and the defined device is not connected. |
| Unknown | Aqua | There is no definition in the device definition information, but a device is connected. |
| Mismatch | Red | There is a definition in the device definition information, but a device that is different from the definition is connected. |
| No Configuration | | There is no definition in the device definition information, and no device is connected. |

Note that the device existence checking portion 151-1, by way of illustration, evaluates as "OK" if the device connection status is "Connected," "Disconnected," or "Not Configured," and evaluates as "NG" if "Unknown," or "Mismatch." Entries wherein the status check result is "NG" may be displayed with the background color different from the color of other entries (for example, red) to provide a highlighted display. The date and time at which the device connection status was checked may also be displayed in the device status list.

Figure 9:
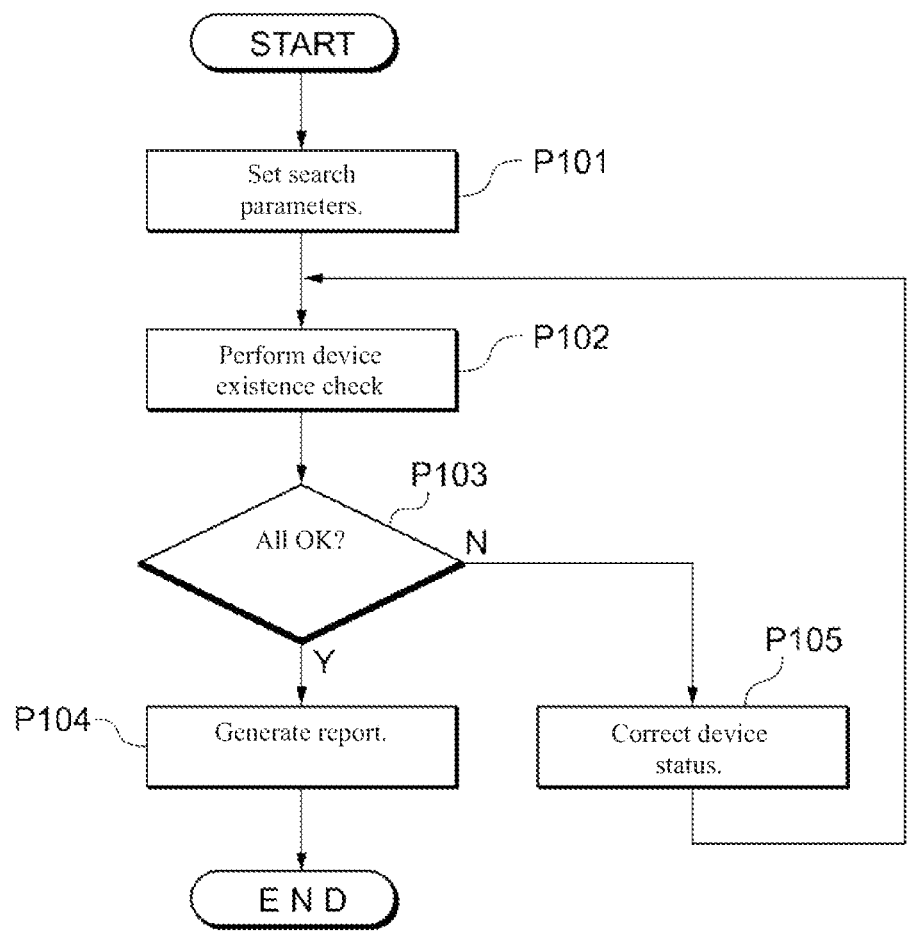
FIG. 9 is a flowchart for explaining the device existence checking process by the device monitoring unit illustrated in FIG. 1, FIG. 3, and FIG. 4.

FIG. 9 shows an example of an operation flowchart for the "Device Existence Check." First, the operator clicks the Search button 201 to call the Search Parameters Setup window as illustrated in FIG. 8, and, in this Search Parameters Setup window, the operator sets up the search parameters for the applicable devices 10, for executing the "Device Existence Check" (Process P101).

The device existence checking portion 151-1 searches the device definition information based on the search parameters that have been set up in the Search Parameters Setup window, and displays, in the Device List Display field 210, the devices 10 that match the search parameters.

Thereafter, when an Execute event for the "Device Existence Check" is produced through the Execute button 208 being clicked, the device monitoring unit 15 (the device existence checking portion 151-1) performs device connection status queries on the link module 15A for the devices 10 that have been retrieved.

A smart communication command (a device connection status acquisition command), for example, may be used in this query. The command may be issued in units of individual devices 10, or may be issued in units (groups) of I/O units 11 to which the devices 10 are connected.

If the commands are issued in units of I/O units 11, then it is possible to check the device connection statuses grouped by units of I/O units 11, thus making it possible to achieve an increase in speed in the "Device Existence Check." Note that the processes regarding the queries may be executed through multithreading. Doing so makes it possible to minimize the effect on the user interface and other systems during the query process as well.

The link module 15A that has received the device connection status acquisition command sends (responds), to the device monitoring unit 15, the live list information that is acquired and stored from the devices 10, through the I/O units 11.

The device monitoring unit 15 compares the live list information received from the link module 15A to device definition information that is, for example, stored in the RAM 152, to evaluate the connection statuses of the devices 10 based on the comparison results and criteria such as illustrated in Table 1 (Process P102). Partial information elements in the live list information and in the device definition information, for example, the "Device Tag" and the "Device Type," may be used in this comparison.

By way of illustration, the evaluation results may be displayed by the device unit using icons of different colors, as shown in Table 1 and FIG. 7. When an icon is, for example, double-clicked using the mouse, or the like, the applicable live list information may be displayed as a tooltip, or the like.

By way of illustration, the items displayed may include, for example, the device tags, the device types, the device revisions, the vendor names, the model names, the smart communication protocol revisions, and the like. This makes it easy for the operator to identify, for example, the statuses of the device 10 that cause the "Device Existence Check" results to be "NG" (that is, the causes of the NG).

Note that the device existence checking portion 151-1 may evaluate the device connection status to be a "Mismatch" if the "Device Tag and/or the "Device Type" in the device information recorded in the link module 15A is different from that of the device 10 that is actually connected. Consequently, the device existence checking portion 151-1 may evaluate the device connection status to be "Connected" (OK) even if there is a discrepancy in the "Device ID" or the "Device Revision" in the device information.

The device monitoring unit 15 (device existence checking portion 151-1) checks whether or not all of the device connection statuses are "OK" ("Connected" or "Disconnected") for all of the devices 10 that are connected to the same I/O unit 11 (Process P103). If all of the device connection statuses are evaluated as "OK" (Route Y in Process P103), then the device existence checking portion 151-4 defines the "Device Existence Check" result as "OK."

If the Report button 203 is clicked, then the device existence checking portion 151-1 generates a report (Process P104).

On the other hand, if the results of the device connection status checks are not all evaluated as "OK" (that is, if there is a "Unknown Device" or "Mismatch"), then the device existence checking portion 151-1 defines the "Device Existence Check" result for the applicable devices 10 as "NG." Note that if there is an error on a level higher than that of the I/O unit 11, then the evaluation may be "Mismatch" for all of the devices 10 that are connected to the applicable I/O unit 11.

The device monitoring unit 15 (device existence checking portion 151-1) displays the evaluation results, described above, in the Device List Display field 210. Note that for those devices 10 for which the "Device Existence Check" result is "NG," the operator will correct the device status by, for example, correcting the device information (from route N in Process P103 through Process P105). The "Device Existence Check" is executed repeatedly until there are no devices 10 for which the "Device Existence Check" result is "NG" (Route N in process P103).

As described above, the device monitoring unit 15 is able to check, through a monitoring system, the connection statuses of the devices 10 that are connected to the I/O units 11, through the functions of the device existence checking portion 151-1. Consequently, the operator is able to check easily that the connection statuses of the devices 10 are correct at the time that the factory or plant is started up, during operation thereof, and the like, making it possible to perform the factory startup operations and continuing operations smoothly. The result is a major contribution to a reduction in the operating load on the operators, a shortening of lead times (and, by extension, a reduction in power consumption, and the like), and to ensuring safety of the factory, plant, or the like.

(1-4-2) Commissioning

Figure 10:
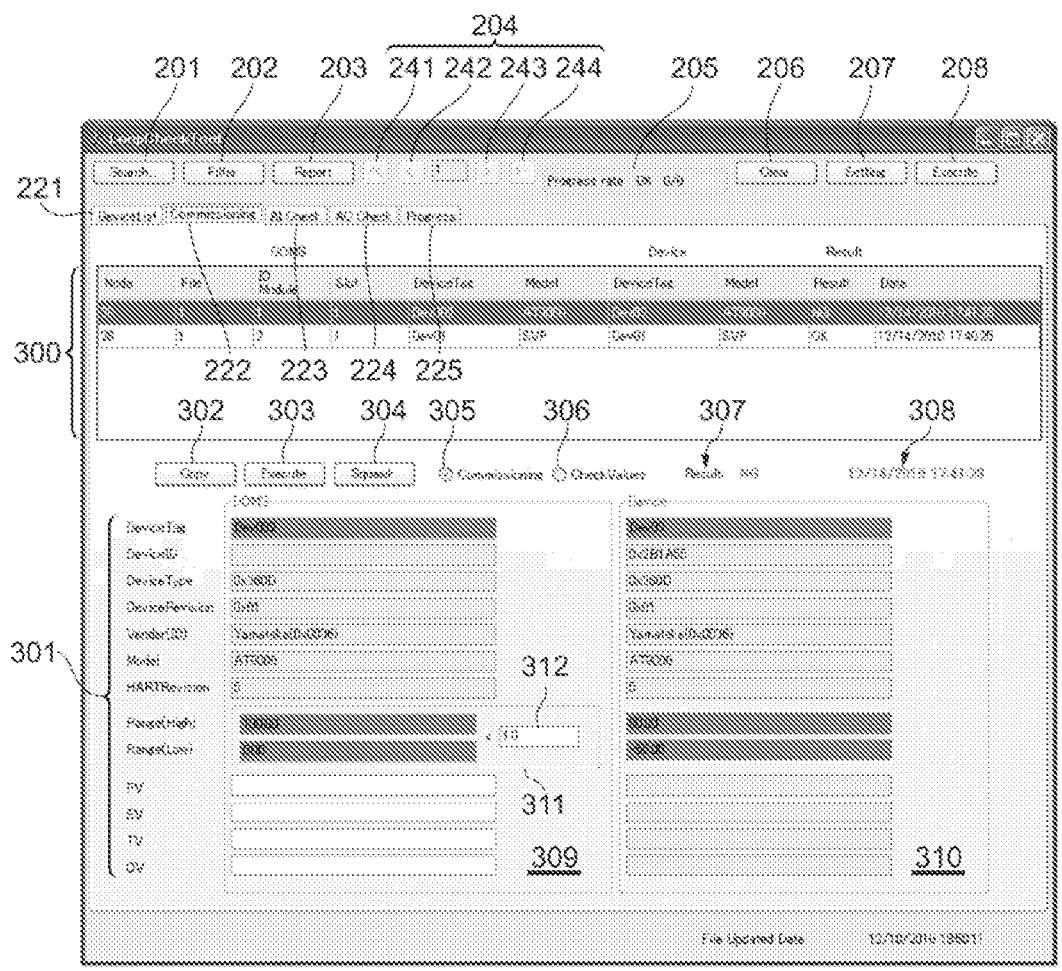
FIG. 10 is a diagram illustrating one example of a Loop Checking Tool window (Commissioning tab) displayed on a monitor of the device monitoring unit illustrated in FIG. 1, FIG. 3, and FIG. 4.

As illustrated in FIG. 10, for example, the "Commissioning" function (the commissioning portion 151-2) can be executed from the state wherein the Commissioning tab 222 has been selected in the Loop Checking Tool window. In the state wherein the Commissioning tab 222 is displayed, the buttons and fields assigned identical codes to those in FIG. 10 provide the corresponding functions in "Commissioning,"

For example, in the state wherein the Commissioning tab 222 is displayed, it is possible to add and use as search parameters (search keys), in a device search that uses the search button 201, the information used in "Commissioning" as well. The search key may be held in the device monitoring unit 15 as long as the loop check tool has not finished.

When the Report button 203 is clicked, the commissioning portion 151-2 produces the results of the "Commissioning" as a file of a specific format, such as a CSV file.

The Progress Rate Display field 205, by way of illustration, displays the proportion of the devices 10 that have completed the execution of "Commissioning" to all of the devices 10.

When the Clear button 206 is clicked, the commissioning portion 151-2 clears the commissioning results that are displayed in the Device Details pane 301.

When the Execute button 208 is clicked, the commissioning portion 151-2 executes the "Commissioning" and/or the "Output Value Check" on the devices 10 that are displayed in the Device List Display field 300. The system may be such that the Execute button 208 may be converted into a Cancel button while the "Commissioning" and/or the "Output Value Check" is being performed. When the Cancel button is clicked, the commissioning portion 151-2 will cancel the execution of the "Commissioning" and/or the "Output Value Check." Note that the system may be such that the Cancel button is provided separately from the Execute button 208.

A Device List Display field 300 for displaying a device list may be provided in the top portion of the Commissioning tab 222. The items displayed in this field 300 are, by way of illustration, node numbers, file numbers, I/O module numbers, slot numbers, device tags, along with model names, evaluation results for the "Commissioning" and/or the "Output Value Checks," the date and time, and the like.

Entries wherein the "Commissioning" and/or "Output Value Check" result is "NG" may be displayed with the background color different from the color of other entries (for example, red) so as to be easily noticeable to the operator.

It should be possible to determine freely the number of entries that can be displayed on one page of the Device List Display field 300 (that is, the number of lines in the list view). As one non-constraining example, the number of devices that can be displayed in a single page is a maximum of 80. If the number of devices to be displayed is greater than the maximum number that can be displayed on a single page, then, for example, a vertical scrollbar may be displayed on the right edge of the Device List Display field 300, in a system wherein it is possible to scroll to display all of the devices in the page.

A Device Details field 300, for displaying detailed information about devices, may be provided in the bottom portion of the Device List Display field 300 in the Commissioning tab 222. By way of illustration, detailed information about the device 10 that is currently selected in the Device List Display field 300 is displayed in the Device Details pane 301.

By way of illustration, the items displayed in the Device Details pane 301 are, for example, the device tags, the device IDs, the device types, the device revisions, the vendors, the vendor IDs, the model names, the smart communication protocol revisions, range information (high ranges and/or low ranges), and so forth.

A Device Definition Information field 309 for displaying the device definition information that is defined by an engineering tool, or the like, and a Live List information field 310, for displaying live list information obtained from a device 10 using a smart communication command may, be provided in the Device Details pane 301. These fields 309 and 310 may be displayed, for example, tined up side-by-side, making it easy to discern visually whether or not the respective information match each other.

If the "Device ID" and/or "Device Revision" are blank in the Device Definition Information field 309 (that is, not yet defined), then the evaluation results may be defined as "OK" if the items other than this information match, and the undefined information may be copied from the live list information. This copying either may be performed automatically or may be performed through clicking, for example, a Copy button 302. If the "Device ID" and/or "Device Revision" are not blank, then this information may be added to be subject to evaluation in the "Commissioning."

When the Copy button 302 is clicked, the Commissioning portion 151-2 copies the "Device ID" to the device definition information from the live list information of the selected device 10. When the Copy button 302 is clicked in the "Output Value Check," the output value checking portion 151-7 will copy, to the device definition information, the "PV," "SV," "TV," "QV," and the like, from the live list information.

When the Execute button 303 is clicked, the commissioning portion 151-2 executes the "Commissioning" and/or the "Output Value Check" regarding the selected device 10. The device definition information defined by an engineering tool, or the like, and the live list information obtained from the device 10 using a smart communication command are compared through the execution of the "Commissioning."

Note that the system may be such that the Execute button 303 may be converted into a Cancel button while the "Commissioning" and/or the "Output Value Check" is being performed. When the Cancel button is clicked, the commissioning portion 151-2 and/or the output value checking portion 151-7 will cancel the execution of the "Commissioning" and/or the "Output Value Check." Note that the system may be such that the Cancel button is provided separately from the Execute button 303.

The commissioning portion 151-2 can send a Squawk command, which is one of the smart communication commands, to the selected device 10 when the Squawk button 304 is clicked. Doing so makes it possible to check for a visible, audible, and/or mechanical response that is unique to the device 10, indicating the reception of the command. Note that if the device 10 does not support a Squawk command, then the commissioning portion 151-2 will display an error message on the monitor 156, or the like.

When the "Commissioning" radio button 305 is checked, the CPU 151 enables the "Commissioning" function. When the "Output Value Check" radio button 306 is checked, the CPU 151 enables the "Output Value Check" function.

By way of illustration, the evaluation results for the "Commissioning" and/or the "Output Value Check" of the devices 10 that are selected are displayed in the Evaluation Results field 307. For example, if the results for "Commissioning" are all matches, then "OK" is displayed as the evaluation results. If there is a mismatch in the result of "Commissioning," then "NC" will be displayed as the evaluation result. If the evaluation result is "NC" then the item wherein there is a mismatch may be displayed in a different display color (for example, displayed in red) so as to be noticed easily by an operator.

By way of illustration, the dates and times (yyyy/MM/dd HH:mm:ss) of the "Commissioning" and/or "Output Value Check" performed most recently regarding the selected devices 10 are displayed in the Date and Time field 308.

Note that the Device Definition Information field 309 may be provided with a Range Information Setting field 311, and a Conversion Factor field 312, for setting a conversion factor for the range information (which is, for example, 1.0 by default) may be provided in the field 311. The conversion factor is the factor for converting to the actual value from a setting value in a distributed controlling system (DCS) (for example, a controller 17). The conversion factor may be stored, included in the live list information, at the completion of execution of "Commissioning,"

Figure 11:
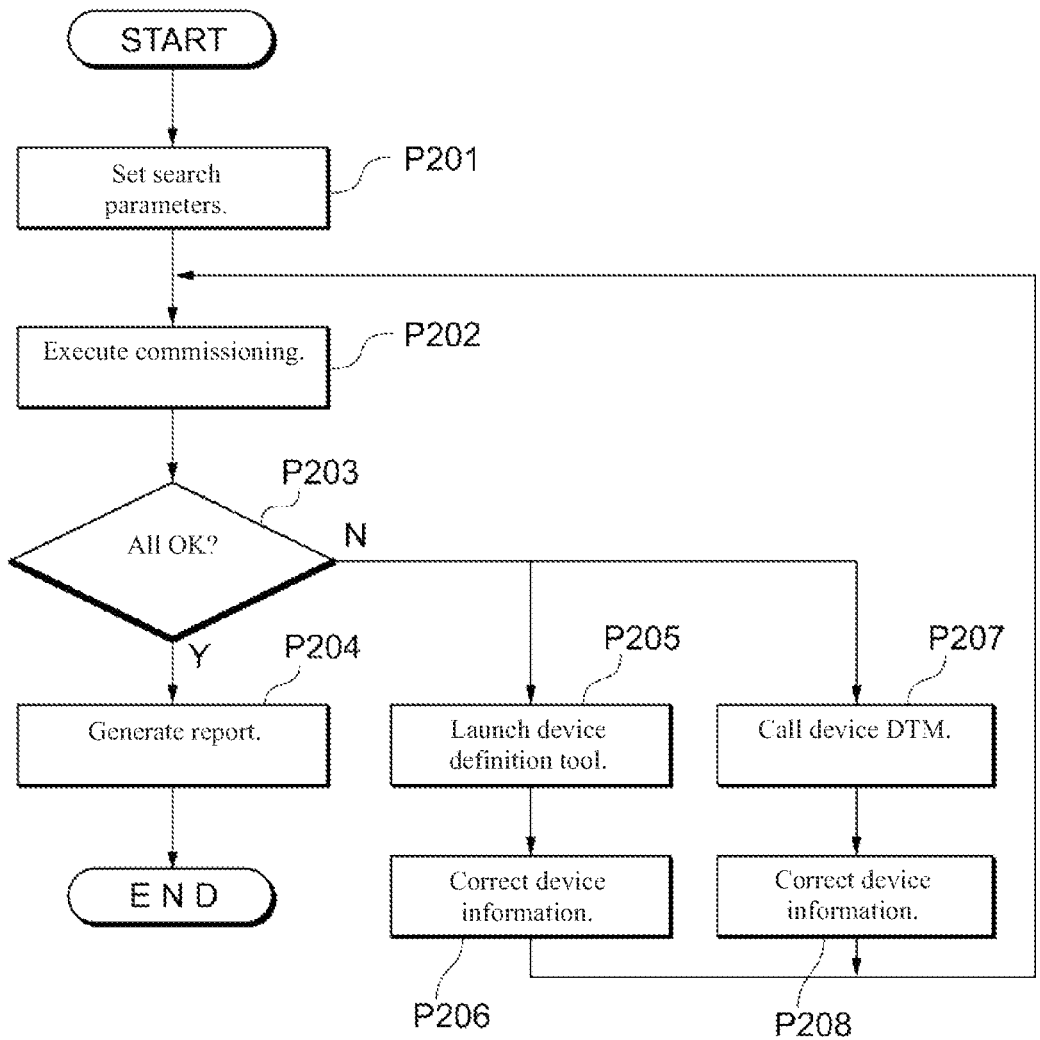
FIG. 11 is a flowchart for explaining the commissioning process by the device monitoring unit illustrated in FIG. 1, FIG. 3, and FIG. 4.

FIG. 11 shows an example of an operation flowchart for the "Commissioning." First, the operator clicks the Search button 201 to call the Search Parameters Setup window as illustrated in FIG. 8, and, in this Search Parameters Setup window, the operator sets up the search parameters for the applicable devices 10, for executing the "Commissioning" (Process P201).

The commissioning portion 151-2 searches the device definition information based on the search parameters that have been set up in the Search Parameters Setup window, and displays, in the Device List Display field 300, the devices 10 that match the search parameters.

Thereafter, when either the Execute button 208 that is provided in the Loop Checking Tool window (above the Device List Display field 300) or the Execute button 303 that is provided in the Device Details pane 301 is clicked, the commissioning portion 151-2 performs commissioning for the devices 10 that are displayed in the Device List Display field 300 (Process P202).

For example, the commissioning portion 151-2 queries the link module 15A for device information for a device 10. It is possible to use a smart communication command (the Commissioning Data Collecting command), for example, in this query. The command may be issued in units of individual devices 10, or may be issued in units (groups) of I/O units 11 to which the devices 10 are connected.

If the commands are issued in units of units 11, then it is possible to perform the commissioning grouped by units of I/O units 11, thus making it possible to achieve an increase in speed in the "Commissioning." Note that the processes regarding the queries may be executed through multithreading. Doing so makes it possible to minimize the effect on the user interface and other systems during the query process as well.

When the device information (the live list information) for a device 10 is obtained, then the commissioning portion 151-2 compares the device definition information and the live list information obtained from the device 10, to evaluate whether or not the two match (Process P203).

If the evaluation results are all "OK" (Route Y in Process P203) and the Report button 203 is clicked, then the commissioning portion 151-2 generates a report for the results of the "Commissioning" as, for example, a CSV file (Process P204).

Note that even if the "Commissioning" result is "NG" (Route N in Process P203), the device monitoring unit 15 need not necessarily update the device definition information, overwrite the live list information, or the like. If necessary, it is possible to use the device definition tool in regards to updating device definition information (Processes P205 and P206). The overwriting of the live list information (the device information possessed by the device 10) can be performed through calling the Device Type Manager) (DIM) from a device administering tool (not shown) in the device monitoring unit 15 (Processes P207 and P208).

As described above, the device monitoring unit 15 is able to check easily, through the monitoring system, the match between device definition information, which is set up in advance, and device information of a device 10 that is connected to an I/O unit 11, using the functions of the commissioning portion 15-12.

Consequently, it is possible for the operators to perform the factory startup operations and continuing operations smoothly. The result is a major contribution to a reduction in the operating load on the operators, a shortening of lead times (and, by extension, a reduction in power consumption, and the like), and to ensuring safety of the factory, plant, or the like.
(1-4-2-1) Range Check The device monitoring unit 15 (CPU 151) is able to perform checks on the range settings (high ranges and low ranges) of the devices 10 (range checks) at the time that "Commissioning" is performed, through functioning as the range checking portion 151-6 (shown in FIG. 4). Of the analog input (AI) and the analog output (AO) of the device 10, the "Range Check" focuses on the range settings for at least the AI.

Figure 12:
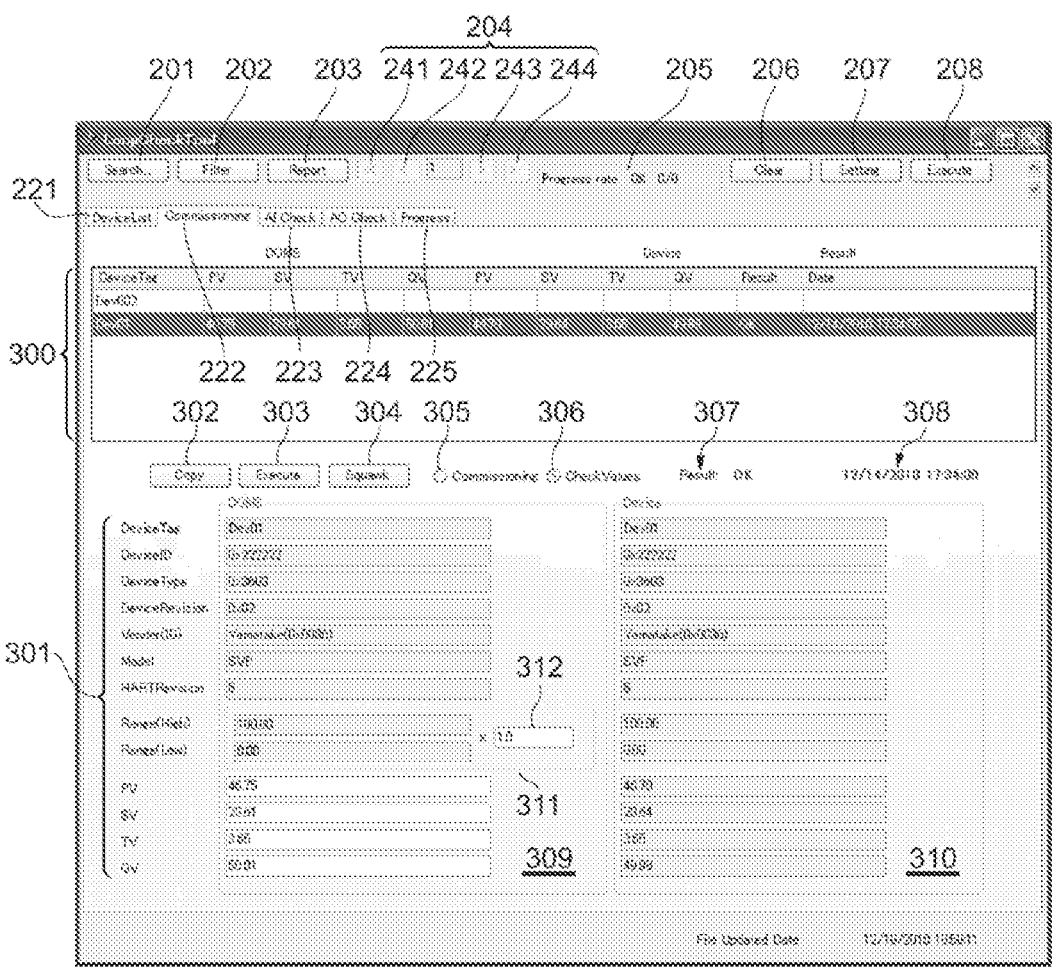
FIG. 12 is a diagram illustrating one example of a Loop Checking Tool window (Output Value Check screen) displayed on a monitor of the device monitoring unit illustrated in FIG. 1, FIG. 3, and FIG. 4.

The CPU 151 (the range checking portion 151-6, shown in FIG. 4) compares a value wherein a range setting value in the device definition information is multiplied by a conversion factor (which by default is, for example, 1), to a range setting value in the live list information obtained from the device 10. The range checking portion 151-6 evaluates the result as "OK" if the two match within the tolerance error range, and "NG" if they are different, and displays the evaluation result in, for example, an Evaluation Results field 307. Note that range information set in a controller 17 may be included as subject to comparison with the range information in the device definition information in the "Range Check."
(1-4-2-2) Output Value Check When an Execute button 208 or 303 is clicked when the "Output Value Check" radio button 306 is checked in the Commissioning tab 222, then the device monitoring unit 15 (the CPU 151) executes checks on the PVs (pressure values), SVs (flow rate values), TVs (temperature values), and QVs (heat quantity values) through functioning as the output value checking portion 151-7 (shown in FIG. 4). Note that an example illustrating a screen (window) wherein the "Output Value Check" radio button 306 is checked is shown in FIG. 12.

The command values for the PV, SV, TV, QV, and the like, that are subject to comparison may be inputted as appropriate by the operator. The specification values are stored in the RAM 152 or the memory device 154. When the Copy button 302 is clicked, the output values for, for example, PV, SV, TV, QV, and the like, obtained from the device 10 through the monitoring system, may be copied (stored) to, for example, the RAM 152 or the memory device 154, and these output values may be used as specification values.

Moreover, storing the output values makes it possible for the device monitoring unit 15 (the output value checking portion 151-7) to perform checks on the various output values at the time at which the operation of the device 10 is halted for operations such as process maintenance and inspection, or at the time at which the device 10 is restarted. The point in time at which the operation of the device 10 is stopped is an example of a first time point, and the point in time at which the operation of the device 10 is restarted is an example of a second time point.

Moreover, the RAM 152 and the memory device 154 are examples of memories for storing the analog output values that are outputted by the devices 10 to the I/O modules 11 (analog communication routes) at the first time point, received from the devices 10 through the digital communication route 16 of the monitoring system.

Through this, the analog output value that is outputted from a device 10 to an I/O module 11 (an analog communication route) at the second time point, received from the device 10 through the digital communication route 16, is compared, by the output value checking portion 151-7, to the stored analog output value from the first time point. It is possible for the output value checking portion 151-7 to check, through this comparison, whether or not the analog output operation of the device 10 is correct.

For example, let us assume that the analog output value at the point in time at which the operation of the device 10 is restarted, as an example of a second time point, is quite different, exceeding the tolerance range, in relation to the analog output value at the point in time at which the operation of the device 10 was stopped, which is an example of a first time point. In this case, the output value checking portion 151-7 would evaluate the result of the "Output Value Check" as "NG." On the other hand, if the discrepancy between the analog output values at these two points in time is within the tolerance range, then the output value checking portion 151-7 will evaluate the "Output Value Check" result as "OK."

When the Report button 203 is clicked after the completion of an "Output Value Check," as described above, then the CPU 151 (the output value checking portion 151-7) will create a report that includes the output value check settings (the conversion factors, and the PVs, SVs, TVs and QVs of the device definition information), the output values, the check results, the dates and times, and the like.

The operator, based on this report, is able to tell whether or not some sort of problem has occurred in the analog output operation of the device 10 during an operation such as, for example, process maintenance or inspection, or the like, enabling the operator to execute appropriate countermeasures.
(1-4-3) AI Check As already described, the "AI Check" is a process that checks the analog input of the device 10 based on a response by the device 10 to an instruction from the I/O module 11, through the monitoring system, that specifies, to the device 10, an output value (an analog DC signal between 4 and 20 mA).

Figure 13:
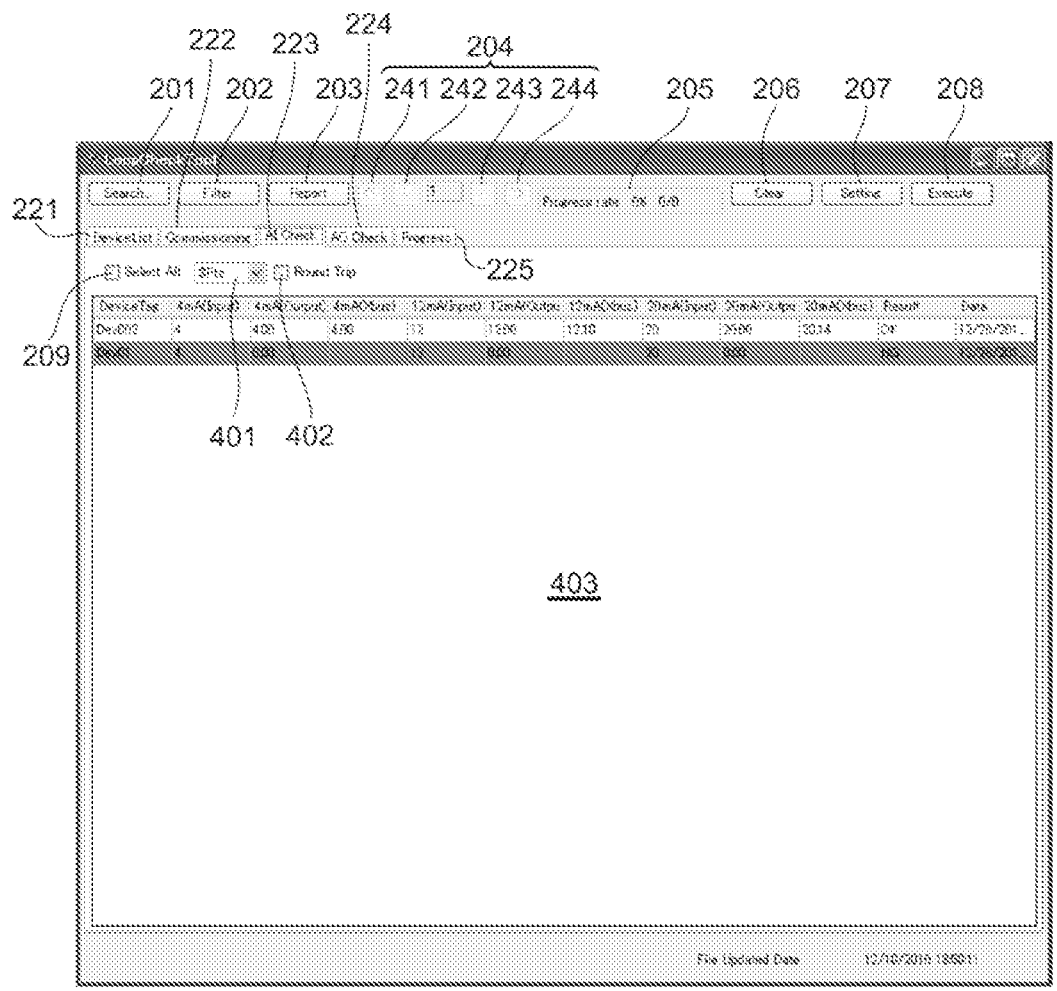
FIG. 13 is a diagram illustrating one example of a Loop Checking Tool window (Analog Input Check tab) displayed on a monitor of the device monitoring unit illustrated in FIG. 1, FIG. 3, and FIG. 4.

The "AI Check" function (the AI checking portion 151-3, shown in FIG. 4) is activated through the selection of the AI Check tab 223 in the Loop Checking Tool window, such as illustrated, for example, in FIG. 13. In the state wherein the AI Check tab 223 is displayed, the buttons and fields that are assigned codes that are identical to those in FIG. 7 provide the corresponding functions to the "AI Check,"

For example, the information for the route to the device 10 can be used in the search parameters (search key) for device searching by the Search button 201 in the state that the AI Check tab 223 is displayed. The search key may be held in the device monitoring unit 15 as long as the loop check tool has not finished.

When the Report button 203 is clicked, the AI checking portion 151-3 generates the "AI Check" result in a report file of a specific format, such as CSV.

The Progress Rate Display field 205 displays, for example, the proportion of the devices 10 that have completed the execution of "AI Check" to all of the devices 10.

When the Clear button 206 is clicked, the AI checking portion 151-3 clears the results for the "AI Check" of the device 10 that is selected in the device list that is displayed as the searching result in the Device List Display field 403 of the AI Check tab 223. The Clear button 206 may be placed into an enabled state wherein it can receive a selection operation when a device 10 wherein the result of the "AI Check" is not blank is selected.

When the Execute button 208 is clicked, the AI checking portion 151-3 executes the "AI Check" of the devices 10 that are selected in the device list that is displayed as the searching result in the Device List Display field 403 of the AI Check tab 223. The system may be such that the Execute button 208 may be switched into a Cancel button during the execution of the "AI Check." When the Cancel button is clicked, the AI checking portion 151-3 will cancel the execution of the "AI Check." Note that the system may be such that the Cancel button is provided separately from the Execute button 208.

The AI Check tab 223 may be provided with a Checkpoint Count Setup menu 401 and a Round Trip checkbox 402.

The Checkpoint Count Setup menu 401 is used in order to specify the number of points (N points, where N is a whole number) for the "AI Check" that will be performed in relation to the device 10. For example, when the Checkpoint Count Setup menu 401 is clicked, point count candidates of 3 points (3 PTS) and 5 points (5 PTS) may be displayed as a pull-down menu, enabling one of these to be selected.

The Round Trip checkbox 402 is used in order to specify whether to perform the "AI Check" on the device 10 in only the uplink direction (the direction from the device 10 to the I/O module 11), or to perform it in a round trip between the device 10 and the I/O module 11. When a check is placed in the Round Trip checkbox 402, then "Round Trip" is specified.

As a non-limiting example, when "3 points" is selected in the Checkpoint Count Setup menu 401 and a check is placed in the Round Trip checkbox 402, the AI checking portion 151-3 applies, to the device 10, a total of five points worth of Output commands, 4 mA→12 mA→20 mA→12 mA→4 mA, to check the actual analog output values of the devices 10 in relation to each of these Output commands.

By way of illustration, an error threshold value (%), output value read delay time, output value read count, and the like, are included in the setup data used in the "AI Check."

The devices 10 that are displayed in the Device List Display field 403 of the AI Check tab 223 may be limited to devices 10 that are connected to I/O modules 11 that are able to provide analog input to the device 10. By way of illustration, the display items in the Device List Display field 403 are, for example, device tags, specification values, output values from the devices 10, input values from the I/O modules 11 (the items marked as "Xbus" in FIG. 13), the results of the AI check, dates and times, and the like. Device entries wherein the "AI Check" result is "NG" may be displayed with a different background color (for example, red) to provide a highlighted display.

Figure 14:
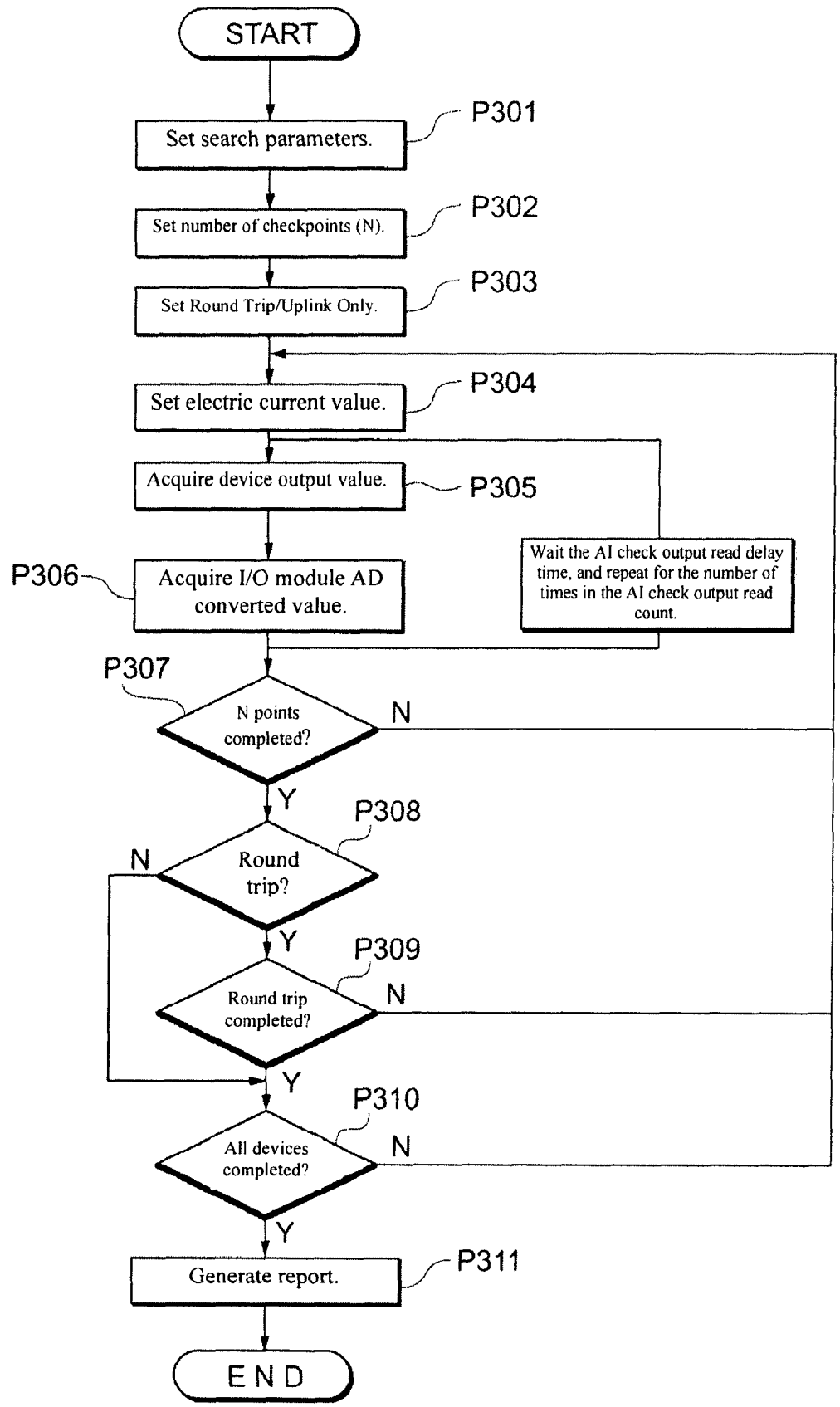
FIG. 14 is a flowchart for explaining the analog input checking process by the device monitoring unit illustrated in FIG. 1, FIG. 3, and FIG. 4.

FIG. 14 shows an example of an operation flowchart for the "AI Check."

First, the operator clicks the Search button 201 to call the Search Parameters Setup window as illustrated in FIG. 8, and, in this Search Parameters Setup window, the operator sets up the search parameters for the applicable devices 10, for executing the "AI Check" (Process P301).

The AI checking portion 151-3 searches the device definition information based on the search parameters that have been set up in the Search Parameters Setup window, and displays, in the Device List Display field 403, the devices 10 that match the search parameters.

Following this, the operator selects entries for devices 10 for which to perform the "AI Check" from the device list that is displayed in the Device List Display field 403, and selects, from the Checkpoint Count Setup menu 401, the number of checkpoints (3 points or 5 points) for the "AI Check" for the selected devices 10 (Process P302). Moreover, the operator puts a check into the Round Trip checkbox 402 if the "AI Check" is to be performed with a "Round Trip" (Process P303).

The AI checking portion 151-3 sets the electric current value for the Output command for the device 10 following the setup set forth above (Process 304). For example, if the Output command is 0%, then the electric current value is set to 4 mA, if 50%, then 12 mA, or if 100%, then 20 mA. The Output command may use a smart communication command.

The AI checking portion 151-3 sends the Output command for the device 10 to the TCP/UDP communication route 16, and then waits for a specific time interval (the AI check output read delay time) (Process P305). This delay time can be set to a time in accordance with the time required for stabilization of the analog DC signal that is outputted to the I/O unit 11 by the device 10 that has received the Output command.

The Output command, which is a digital signal, is sent to the device 10 through smart communications through the smart communications processing portion 115 (the NIC 1151, the calculating portion 1152, the smart communications modem 1154, the separating/superimposing portion 1155, and the interface 1156) of the I/O module 11.

The device 10 (the calculating portion 101) outputs an analog DC signal to the I/O module 11 with an electric current value specified by the Output command received, through smart communication, from the I/O module 11. Note that the calculating portion 101 stores to the memory 104, for example, the electric current value specified by the Output command (a digital setting value obtained through the smart communications modem 107).

On the other hand, after the AI check output read delay time has elapsed, the device monitoring unit 15 (the AI checking portion 151-3) sends, to the TCP/UDP communication route 16, a smart communication command (a Read command) for acquiring at the electric current value that is outputted to the analog communication route to the I/O module 11 from the interface 108 after DA conversion by the DAC 103, for the electric current value (the digital setting value) that is stored in the memory 104 for the device 10 (Process P305).

The Read command is received by the smart communications processing portion 115 of the I/O module 11 through the TCP/UDP communication route 16. The smart communications processing portion 115 (the calculating portion 1152) sends the received Read command to the device 10 through superimposing it, as two different frequency signals, onto the analog DC signal to the device 10, through the smart communications modem 1154 and the separating/superimposing portion 1155.

The two different frequency signals that indicate the Read command are separated from the analog DC signal by the separating/superimposing portion 105 of the device 110, and converted (demodulated) into the original digital signal by the smart communications modem 107, and then inputted into the calculating portion 101. The calculating portion 101, upon receipt of the Read command through smart communications from the I/O module 11 in this way, reads out the electric current value (the digital setting value) from the memory 104, and applies this electric current value to the smart communications modem 107. As a result, the digital setting value for the electric current value that has been read out from the memory 104 is converted (modulated) into the two different frequency signals corresponding to the digital value by the smart communications modem 107, and is superimposed onto the analog DC signal to the I/O module 11 by the separating/superimposing portion 105, to be sent to the I/O module 11.

The two different frequency signals are received by the smart communications processing portion 115 (the interface 1156) of the I/O module 11, are separated from the analog DC current by the separating/superimposing portion 1155, are converted into the respective corresponding digital values (that is, the digital setting value for the electric current value, described above) by the smart communications processing portion 115, and are received by the calculating portion 1152. The calculating portion 1152 sends the received electric current value through the NIC 1151 and the TCP/UDP communication route 16 to the device monitoring unit 15. In this way, the device monitoring unit 15 obtains the electric current value of the analog DC signal that is outputted to the I/O module 11 by the device 10 through the analog communication route, as a digital value prior to the DA conversion by the DAC 103.

Additionally, the device monitoring unit 15 (the AI checking portion 151-3), in cooperation with the link module 15A, communicates with the I/O module 11 (for example, the calculating portion 1152 of the smart communications processing portion 115), to obtain, for example, the AD conversion value of the ADC 112, as the electric current value for the analog DC signal that is actually inputted from the device 110 into the I/O module 11 (Process P306). The AD conversion value of the ADC 112 can be provided to the device monitoring unit 15 through, for example, sending, from the NIC 1151 to the TCP/UDP communication route 16, the AD conversion value obtained through, for example, the calculating portion 1152 communicating with the calculating portion 111 (communication between CPUs).

The device monitoring unit 15 (the AI checking portion 151-3, if necessary, may repeat a specific number of times (the AI check output read count) obtaining of the electric current value that is applied to the DAC 103 of the device 10 (hereinafter termed also the "device output value") (Process P305), and obtaining of the AD conversion value of the analog DC signal that is inputted from the device 10 into the I/O module 11 (hereinafter termed also the "1/C) module input value"). The AI checking portion 151-3 takes the respective means of the device output values and I/O module input values that are obtained through these repetitions. Taking the averages can increase the evaluation accuracy of the "AI Check."

Following this, the device monitoring unit 15 (the AI checking portion 151-3) repeats the aforementioned processes P304 through P306 for the checkpoint count specified in the Checkpoint Count Setup menu 401 (Route N in the Process P307).

When the aforementioned repetitions have been completed (Route Y in Process P307), if the "Round Trip" "AI Check" is specified (Route Y in Process P308), the AI checking portion 151-3 follows the checkpoints in the reverse sequence and repeats the processes P304 through P308 until 0% is reached. For example, in the case of a 3-point round trip, the checks are executed in the sequence of 0%→50%→100%→50%→0%.

Once the "Round Trip" checks have been completed (Route Y in Process P309), the AI checking portion 151-3 repeats the processes P304 through P309 until the "AI Check" has been completed for all of the devices 10 that are subject to the "AI Check" (Route N in Process P310).

Once the "AI Check" has been completed for all of the devices 10 (Route Y in Process P310), then the AI checking portion 151-3 compares the specification values for the devices 10 to the device output values and the I/O module input values.

If the comparison result is that the device output values and I/O module input values are within a specific tolerance error ranges (the AI check error threshold values (%)) for the respective specification values, then the AI checking portion 151-3 evaluates the "AI Check" result as "OK," but if not within the tolerance error range, then the evaluation will be "NG."

Moreover, when the Report button 203 is clicked, the AI checking portion 151-3 produces a report file of the "AI Check" results in a specific format, such as CSV (Process P311). By way of illustration, the report file may include the AI check settings (point count, round trip, etc.), the specification values from the device monitoring unit 15, the device output values, the I/O module input values, the evaluation results, the dates and times, and the like.

As described above, the device monitoring unit 15 is able to check, through the monitoring system, for the proper operation of the device 10 in relation to the analog input, through the functions of the AI checking portion 101-3. Consequently, it is possible for the operator to perform the factory started operations smoothly, resulting in a major contribution to a reduction in the operating load on the operators, a shortening of lead times (and, by extension, a reduction in power consumption, and the like), and to ensuring safety of the factor, plant, or the like. Doing so makes it possible to reduce the maintenance and operating overhead on the operators.

Moreover, the device monitoring unit 15 can obtain a device output value and an I/O module input value through the monitoring system, to compare the two, and thus can check for the proper operation of the DAC 103 and/or the ADC 112 of the I/O module 11. Moreover, it is possible to check the status (Normal/Fault) of the communication through the digital communication route 16 and the status (Normal/Fault) of the communication through the analog communication route between the device 10 and the I/O unit 11.

(1-4-4) AO Check

As already described, the "AO Check" is a process that sets (controls), through the monitoring system (the controller 17), an output value (an analog DC signal between 4 and 20 mA) for the device 10 and checks the analog output of the device 10 based on the response by the device 10 to that setting.

Figure 15:
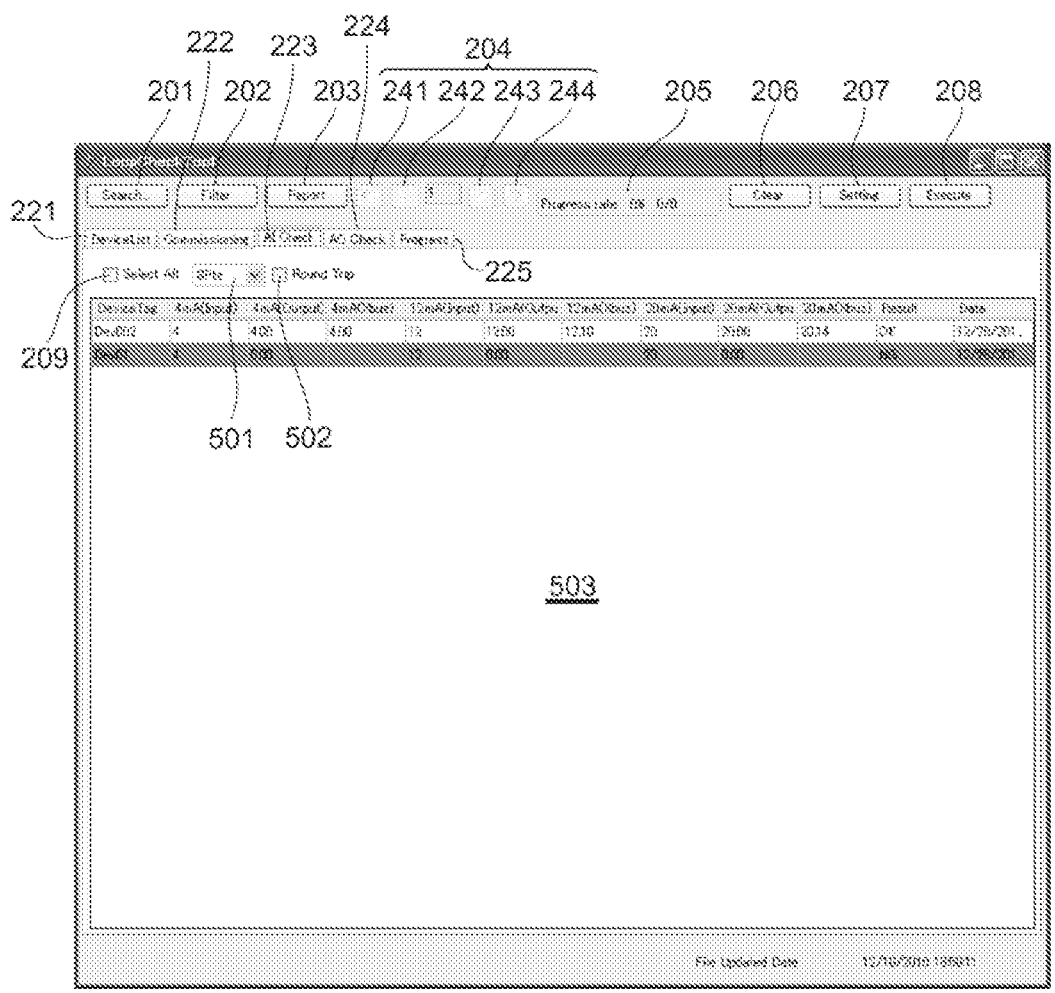
FIG. 15 is a diagram illustrating one example of a Loop Checking Tool window (Analog Output Check tab) displayed on a monitor of the device monitoring unit illustrated in FIG. 1, FIG. 3, and FIG. 4.

The "AO Check" function (the AO checking portion 151-4, shown in FIG. 4) is placed into an executable state through the selection of the AO Check tab 224 in the Loop Checking Tool window, such as illustrated, for example, in FIG. 15. In the state wherein the AO Check tab 224 is displayed, the buttons and fields that are assigned codes that are identical to those in FIG. 7 provide the corresponding functions to the "AO Check,"

For example, the information for the route to the device 10 can be used in the search parameters (search key) for device searching by the Search button 201 in the state that the AO Check tab 224 is displayed. The search key may be held in the device monitoring unit 15 as long as the loop check tool has not finished.

When the Report button 203 is clicked, the AO checking portion 151-4 generates the "AO Check" result in a report file of a specific format, such as CSV.

The Progress Rate Display field 205 displays, for example, the proportion of the devices 10 that have completed the execution of "AO Check" to all of the devices 10.

When the Clear button 206 is clicked, the AO checking portion 151-4 clears the results for the "AO Check" of the device 10 that is selected in the device list that is displayed as the searching result in the Device List Display field 503 of the AO Check tab 224. The Clear button 206 may be placed into an enabled state wherein it can receive a selection operation when a device 10 wherein the result of the "AO Check" is not blank is selected.

When the Execute button 208 is clicked, the AO checking portion 151-4 executes the "AO Check" of the devices 10 that are selected in the device list that is displayed as the searching result in the Device List Display field 503 of the AO Check tab 223. The system may be such that the Execute button 208 may be switched into a Cancel button during the execution of the "AO Check." When the Cancel button is clicked, the AO checking portion 15'-4 will cancel the execution of the "AO Check." Note that the system may be such that the Cancel button is provided separately from the Execute button 208.

The AO Check tab 224 may be provided with a Checkpoint Count Setup menu 501 and a Round Trip checkbox 502.

The Checkpoint Count Setup menu 501 is used in order to specify the number of points (N points) for the "AO Check" that can be performed in relation to the device 10. For example, when the Checkpoint Count Setup menu 501 is clicked, point count candidates of 3 points (3 PTS) and 5 points (5 PTS) may be displayed as a pull-down menu, enabling one of these to be selected. Note that the number of checkpoints that can be set in the "AO Check" may or may not be equal to the number in the case of the "AI Check."

The Round Trip checkbox 502 is used in order to specify whether to perform the "AO Check" on the device 10 in only the uplink direction, or to perform it in a round trip. When a check is placed in the Round Trip checkbox 502, then "Round Trip" is specified.

As a non-limiting example, when "3 points" is selected in the Checkpoint Count Setup menu 501 and a check is placed in the Round Trip checkbox 502, the AO checking portion 151-4 checks a total of five points worth of output values of the device 10, 4 mA→12 mA→20 mA→12 mA→4 mA.

By way of illustration, an error threshold value (%), AO check read interval (period), and the like, are included in the setup data used in the "AO Check."

The devices 10 that are displayed in the Device Display field 503 of the AO Check tab 224 may be limited to devices 10 that are connected to I/O modules 11 that are able to receive analog output from the device 10. By way of illustration, the display items in the Device List Display field 503 are, for example, device tags, specification values, input values from the devices 10 (the output values of the I/O modules 11; the items marked as "Xbus" in FIG. 15), the results of the AO check, dates and times, and the like. Device entries wherein the "A) Check" result is "NG" may be displayed with a different background color (for example, red) to provide a highlighted display.

Figure 16:
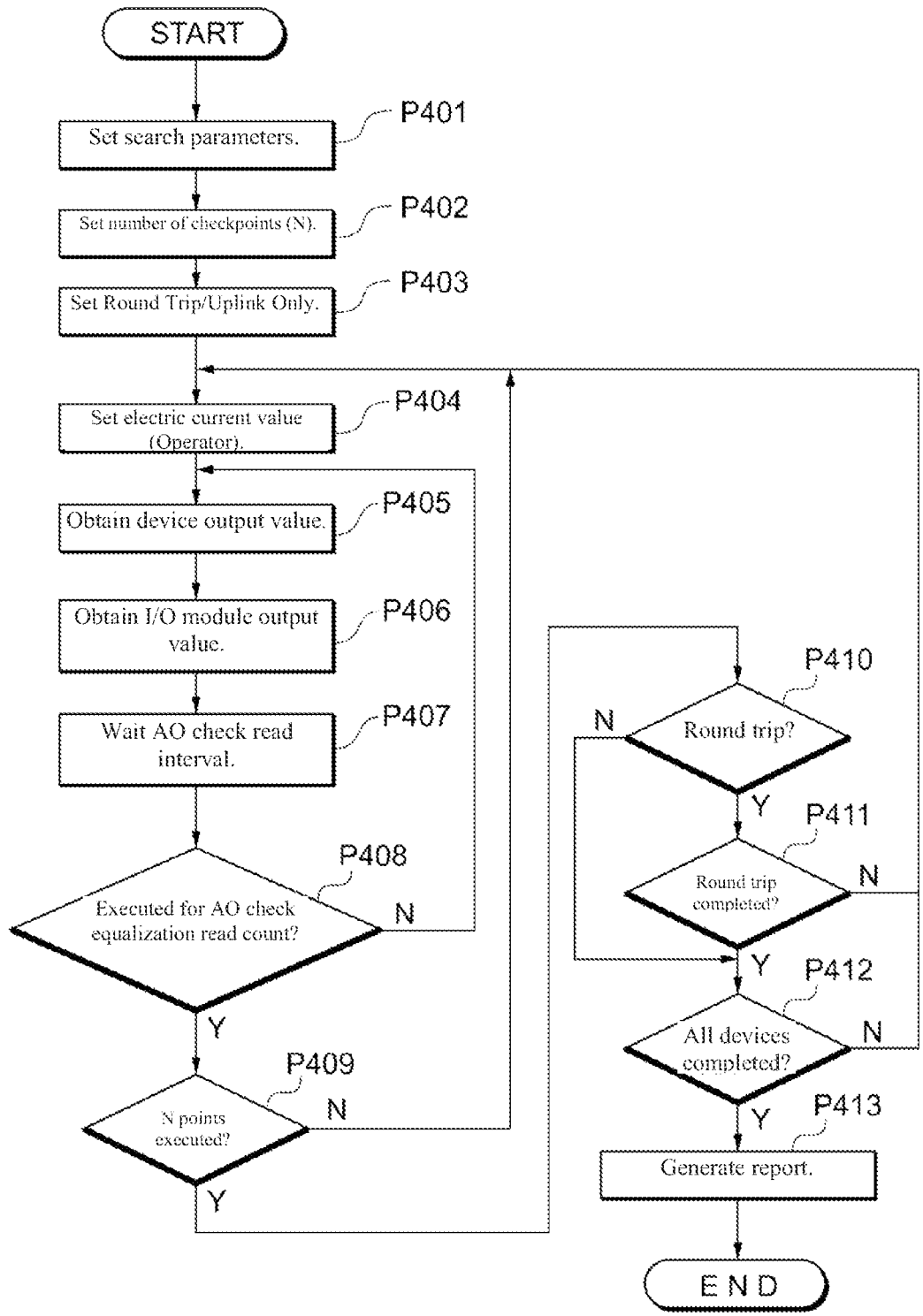
FIG. 16 is a flowchart for explaining the analog output checking process by the device monitoring unit illustrated in FIG. 1, FIG. 3, and FIG. 4.

FIG. 16 shows an example of an operation flowchart for the "AO Check." First, the operator clicks the Search button 201 to call the Search Parameters Setup window as illustrated in FIG. 8, and, in this Search Parameters Setup window, the operator sets up the search parameters for the applicable devices 10, for executing the "AO Check" (Process P401).

The AO checking portion 151-4 searches the device definition information based on the search parameters that have been set up in the Search Parameters Setup window, and displays, in the Device List Display field 503, the devices 10 that match the search parameters.

Following this, the operator selects entries for devices 10 for which to perform the "AO Check" from the device list that is displayed in the Device List Display field 503, and selects, from the Checkpoint Count Setup menu 501, the number of checkpoints (3 points or 5 points) for the "AO Check" for the selected devices 10 (Process P402). Moreover, the operator puts a check into the Round Trip checkbox 502 if the "AO Check" is to be performed with a "Round Trip" (Process P403).

Following this, the operator operates, for example, the operating unit 19 to send, to the controller 17, an electric current value that is the Output command for the device 10 (Process P404). For example, if the Output command is 0%, then the electric current value is set to 4 mA, if 50%, then 12 mA, or if 100%, then 20 mA. Note that the electric current value setting for the controller II 7 may be performed from the device monitoring unit 15.

The controller 17 sends, to the I/O module 11, the electric current value of specified by the operating unit 19. This electric current value is received by the calculating portion 111 through the interface 110 of the I/O module 11. The calculating portion 111 applies the specified electric current value through an analog signal to the device 10 through the DAC 113, the separating/superimposing portion 1155, and the interface 1156. Note that the calculating portion 111 stores, in, for example, the memory 114, the specified electric current value (the digital setting value) from the controller 17.

The device 10 (the calculating portion 101) outputs an analog DC signal to the I/O module 11 through the DAC 103 in accordance with the specified electric current value received from the I/O module 11 through the interface 108, the separating/superimposing portion 105, and the ADC 102. Note that the calculating portion 101 stores, in the memory 104, for example, the electric current value (the digital setting value) received from the I/O module 11.

On the other hand, the device monitoring unit 15 (the AO checking portion 151-4) sends, to the TCP/UDP communication route 16, the smart communication command (the Read command) for obtaining the electric current value that is stored in the memory 104 of the device 10, or in other words, the electric current value (the digital setting value) that is applied to the DAC 103.

The Read command is received by the smart communications processing portion 115 of the I/O module 11 through the TCP/UDP communication route 16, and the smart communications processing portion 115 (the calculating portion 1152) applies, to the smart communications modem 1154 the Read command that has been received. As a result, the Read command is converted (modulated) by the smart communications modem 1154 into two different frequency signals corresponding to the digital value, and is superimposed onto the analog DC signal to the device 10 by the separating/superimposing portion 1155, to be sent to the device 10.

The two different frequency signals are received by the interface 108 of the device 10, are separated from the analog DC signal by the separating/superimposing portion 105, and are converted into the respective corresponding digital values (that is, the Read command) by the smart communications modem 107, and are received by the calculating portion 101.

The calculating portion 101, upon receipt of the Read command through the smart communication from the I/O module 11, as described above, applies, to the smart communications modem 107, the electric current value that is applied to the DAC 103, which is the digital setting value stored in the memory 104. As a result, the electric current value is converted (modulated) by the smart communications modem 107 into two different frequency signals corresponding to the digital value, and is superimposed onto the analog DC signal to the I/O module 11 by the separating/superimposing portion 105, to be sent to the I/O module 11.

The two different frequency signals are received by the smart communications processing portion 115 (the interface 1156) of the I/O module 11, are separated from the analog DC current by the separating/superimposing portion 1155, are converted into the respective corresponding digital values (that is, the digital setting value for the electric current value, described above) by the smart communications processing portion 115, and are received by the calculating portion 1152. The calculating portion 1152 sends the received electric current value through the NIC 1151 and the TCP/UDP communication route 16 to the device monitoring unit 15. In this way, the device monitoring unit 15 obtains the electric current value of the analog DC signal that is outputted to the I/O module 11 by the device 10, as a digital value prior to the DA conversion by the DAC 103.

On the other hand, the device monitoring unit 15 (AO checking portion 151-4), in cooperation with the link module 15A, obtains, through the I/O module 11 (for example, the calculating portion 1152 of the smart communications processing portion 115), the electric current value that is stored in the memory 114, that is, the electric current value (the digital setting signal) that was the Output command from the I/O module 11 to the device 10, as the electric current value that is the digital value applied by the calculating portion 111 to the DAC 113 (hereinafter also termed the "I/O module output value") (Process P406), and then waits for a specific time interval (the AI check read interval) (Process P407). Note that the digital value applied by the calculating portion 111 to the DAC 113 may be provided to the device monitoring unit 15 through, for example, sending, from the NIC 1151 to the TCR/UDP communication route 116, a digital value obtained through, for example, the calculating portion 1152 communicating with the calculating portion 111 (communication between CPUs).

The AO checking portion 151-4 repeats the aforementioned Processes P405 through P407 until the values obtained from the device 10 and the I/O module 11 are within the AO check error threshold value (Route N in Process 408).

If the values obtained from the device 10 and the I/O module 11 are within the AO check error limit threshold value, then the AO checking portion 151-4 records the average value.

Following this, the device monitoring unit 15 (the AO checking portion 151-4) repeats the aforementioned processes P404 through P408 for the checkpoint count specified in the Checkpoint Count Setup menu 401 (Route N in the Process P409).

When the aforementioned repetitions have been completed (Route Y in Process P409), if the "Round Trip" "AO Check" is specified (Route Y in Process P410), the AO checking portion 151-4 follows the checkpoints in the reverse sequence and repeats the processes 9404 through P409 until 0% is reached (Route N in Process P411). For example, in the case of a 3-point round trip, the checks are executed in the sequence of 0%→50%→100%→50%→0%.

Once the "Round Trip" checks have been completed (Route Y in Process P411), the AO checking portion 151-4 repeats the processes P404 through P411 until the "AO Check" has been completed for all of the devices 10 that are subject to the "AO Check" (Route N in Process P412).

When the "AO Cheek" has been completed for all of the devices 10 (Route Y Process P412), then the AO checking portion 151-4 compares the output specification values from the controller 17 to the device output values and I/O module output values that have been obtained, respectively, from the devices 10 and the I/O modules 11.

If the comparison result is that each of the output values and I/O module input values are within a specific tolerance error ranges (the AO check error threshold values (%)) for the respective output command values from the respective controllers 17, then the AO checking portion 151-4 evaluates the "AO Check" result as "OK," but if not within the tolerance error range, then the evaluation will be "NG."

Moreover, when the Report button 203 is clicked, the AO checking portion 151-4 produces a report file of the "AO Check" results in a specific format, such as CSV (Process P413). By way of illustration, the report file may include the AO check settings (point count, round trip, etc), the output demand values to the devices 10 from the controllers 17, the device output values, the device input values (the I/O module output values), the evaluation results, the dates and times, and the like.

As described above, the device monitoring unit 15 is able to check, through the monitoring system, for the proper operation of the device 10 in accordance with the output value specified through the controlling system, through the functions of the AO checking portion 101-4. Consequently, it is possible for the operators to perform the factory startup operations smoothly. The result is a major contribution to a reduction in the operating load on the operators, a shortening of lead times (and, by extension, a reduction in power consumption, and the like), and to ensuring safety of the factory, plant, or the like.

Additionally, the device monitoring unit 15 is able to obtain, through the monitoring system, the electric current value (digital setting value) that is applied by the I/O module 11 to the device 10, thus making it possible to check the state (Normal/Fault) of the control communication through the controller 17 and the digital communication route 18 that structure the controlling system. Moreover, it also makes it possible to perform checks regarding, for example, whether or not the I/O module 11 is operating properly in response to the control communication.

Moreover, the device monitoring unit 15 can compare a device output value and an I/O module output value, and thus can check for the proper operation of the DAC 103 of the device 10 and/or the DAC 113 of the I/O module 11. Moreover, it is possible to check the status (Normal/Fault) of the communication through the digital communication route 16 that comprises the monitoring system and the status (Normal/

Fault) of the communication through the analog communication route between the device 10 and the I/O module 11.

(1-4-5) Progress Check

The "Progress Check" is a function that is able to control and check, for each individual device 110, the state of progress of each of the processes (operations) described above, namely the "Device Existence Check," the "Commissioning," the "AI Check," and the "AO Check."

Figure 17:
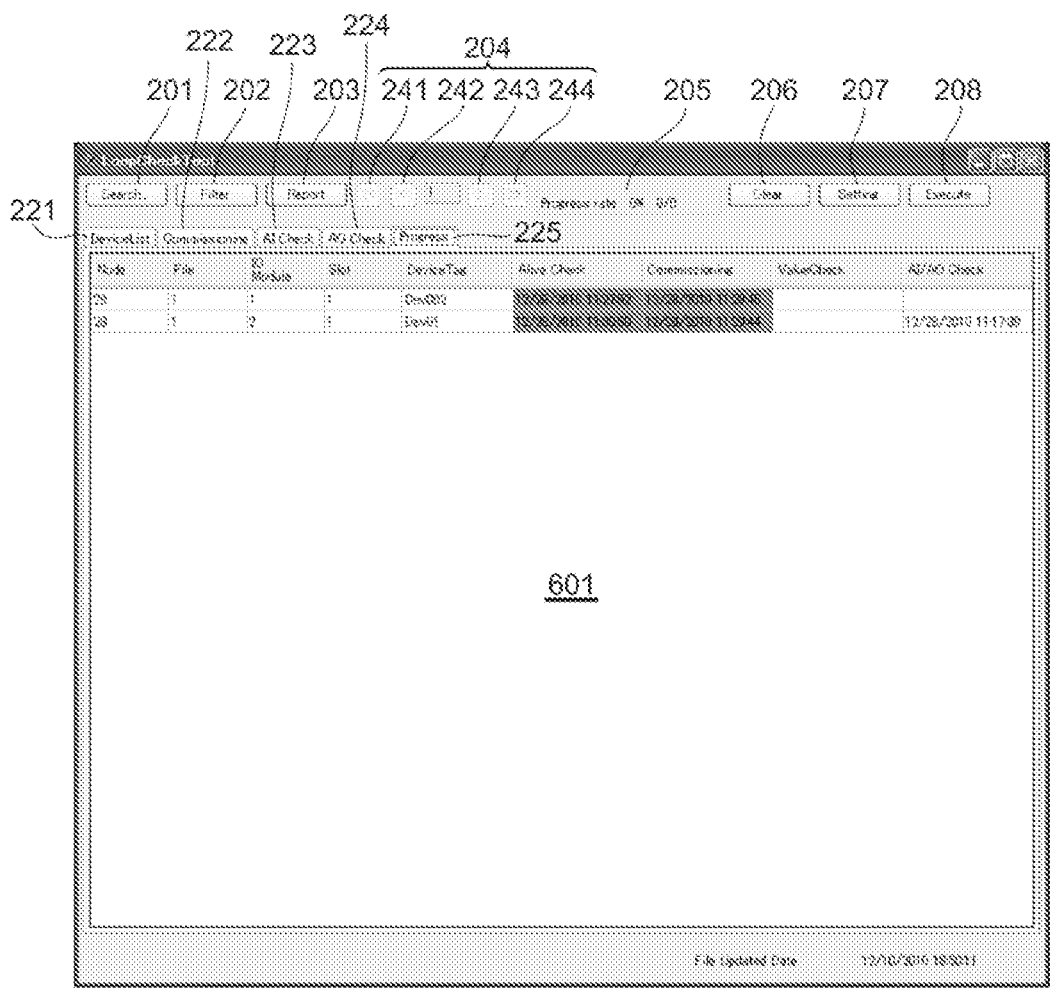
FIG. 17 is a diagram illustrating one example of a Loop Checking Tool window (Progress Check tab) displayed on a monitor of the device monitoring unit illustrated in FIG. 1, FIG. 3, and FIG. 4.

The functions of the "Progress Check" (the progress checking portion 151-5, shown in FIG. 4), as shown in FIG. 17, for example, are placed in an executable state through the selection of the Progress tab 205 in the Loop Checking Tool window. In this state wherein the Progress tab 225 is displayed, the buttons and fields indicated by the same codes as in FIG. 7 provide the corresponding functions to the "Progress Check,"

For example, the information for the route to the device 10 can be used in the search parameters (search key) for device searching by the Search button 201 in the state that the Progress Check tab 225 is displayed. The search key may be held in the device monitoring unit 15 as long as the loop check tool has not finished.

When the Report button 203 is clicked, the progress checking portion 151-5 creates a report file in a specific format, such as CSV, of the operation progress status (for example, dates and times, etc.) for the "Device Existence Check," the "Commissioning," the "AI Check," and "AO Check," individually.

The Progress Rate Display field 205, Clear button 206, and Execute button 208 may be set so as to not be used in the "Progress Check."

A Device List Display field 601 may be provided in the Progress tab 225. By way of illustration, for each device 10 the operation progress status (dates and times, and the like) may be displayed for the "device existence check," "Commissioning," "AI Check," and "AO Check," separately, in the Device List Display field 601.

In the field 601, those device entries wherein the results of the various texts were "NC" may be displayed with a background color that is different from the colors of the other entries (for example, red) to provide a highlighted display, so as to be easily identified by the operators. Note that those items which have not been completed may be left blank.

In this way, in the device monitoring unit 15 it is easy to check whether or not the "Device Existence Check", the "Commissioning," and the AI/AO checks have each been completed in the loop check operation processes, in the Device List Display field 601 in the Progress tab 225. Consequently, it is possible to prevent omissions of checks, redundant checks, and the like, thereby greatly contributing to efficiency of operating processes, reduced operating labor for the operators, assurance of system safety, and so forth.

(2) Other

Note that while, in the example set forth above, the explanation was for a process controlling system 1 wherein there was a mixture of smart communication-compatible field devices 10 and I/O: unit 11 with field devices 12 and I/O units 13 that were not smart communication-compatible, it may also be applied when all of the field devices and I/O units provided in the system 1 are smart communication-compatible.

The invention claimed is:

1. A field device controlling system, comprising:
a field device;
an input/output unit communicating with the field device through an analog communication route; and
a device monitoring unit communicating with the field device through a digital communication route through the input/output unit;
wherein the field device comprises:
a DA converting device performing digital-analog (DA) conversion of a digital setting value for an analog output value to the analog communication route; and
an outputting portion outputting, to the analog communication route, an analog signal in accordance with an analog value that has been DA converted;
wherein the input/output unit comprises:
a memory storing the digital setting value that is applied to the field device through the analog communication route after the DA conversion into the analog value; and
an AD converting device performing analog-digital (AD) conversion of the analog signal inputted through the analog communication route from the field device;
wherein the device monitoring unit comprises:
a check tool obtaining, through respective digital communication routes, a combination of (1) the digital setting value in the field device and either one of (2) a digital value of the AD converting device in the input/output unit and (3) the digital setting value stored in the memory of the input/output unit, and checking a status of the communication through the analog communication route based on the values obtained,
wherein the input/output unit receives the digital setting value, stored in the memory, from the device monitoring unit through the digital communication route; and
wherein the check tool of the device monitoring unit checks the status of communication through the analog communication route and a status of communication through the digital communication route based on the (1) digital setting value and the (2) digital value.

2. A field device controlling system, comprising:
a field device;
an input/output unit communicating with the field device through an analog communication route; and
a device monitoring unit communicating with the field device through a digital communication route through the input/output unit;
wherein the field device comprises:
a DA converting device performing digital-analog (DA) conversion of a digital setting value for an analog output value to the analog communication route; and
an outputting portion outputting, to the analog communication route, an analog signal in accordance with an analog value that has been DA converted;
wherein the input/output unit comprises:
a memory storing the digital setting value that is applied to the field device through the analog communication route after the DA conversion into the analog value; and
an AD converting device performing analog-digital (AD) conversion of the analog signal inputted through the analog communication route from the field device;
wherein the device monitoring unit comprises:
a check tool obtaining, through respective digital communication routes, a combination of (1) the digital setting value in the field device and either one of (2) a digital value of the AD converting device in the input/output unit and (3) the digital setting value stored in the memory of the input/output unit, and checking a status of the communication through the analog communication route based on the values obtained, wherein the input/output unit receives the digital setting value, stored in the memory, through a second digital communication route from a controller that communicates with the input/output unit through the second digital communication route that is separate from the digital communication route; and wherein the check tool of the device monitoring unit checks the status of communication through the analog communication route and a status of the second digital communication route based on the (1) digital setting value and the (3) digital setting value.

* * * * *